United States Patent
Wheaton

(10) Patent No.: US 12,510,616 B2
(45) Date of Patent: Dec. 30, 2025

(54) MAGNETIC RESONANCE IMAGING METHOD, SYSTEM, AND COMPUTER PROGRAM PRODUCT UTILIZING B1 AMPLITUDE-BASED CORRECTIONS

(71) Applicant: CANON MEDICAL SYSTEMS CORPORATION, Otawara (JP)

(72) Inventor: Andrew James Wheaton, Vernon Hills, IL (US)

(73) Assignee: Canon Medical Systems Corporation, Otawara (JP)

( * ) Notice: Subject to any disclaimer, the term of this patent is extended or adjusted under 35 U.S.C. 154(b) by 305 days.

(21) Appl. No.: 18/344,969

(22) Filed: Jun. 30, 2023

(65) Prior Publication Data
US 2025/0004087 A1    Jan. 2, 2025

(51) Int. Cl.
| | |
|---|---|
| *G01R 33/565* | (2006.01) |
| *G01R 33/58* | (2006.01) |
| *G06T 7/00* | (2017.01) |

(52) U.S. Cl.
CPC ..... *G01R 33/56509* (2013.01); *G01R 33/583* (2013.01); *G06T 7/0012* (2013.01); *G06T 2207/10088* (2013.01)

(58) Field of Classification Search
CPC ............ G01R 33/56509; G01R 33/583; G06T 7/0012; G06T 7/2207; G06T 7/10088
See application file for complete search history.

(56) References Cited

U.S. PATENT DOCUMENTS

| | | | |
|---|---|---|---|
| 8,558,547 B2 | 10/2013 | Sacolick et al. | |
| 8,729,897 B2* | 5/2014 | Porter | G01R 33/565 |
| | | | 324/309 |
| 9,194,923 B2* | 11/2015 | Yokosawa | G01R 33/246 |
| 9,400,319 B2* | 7/2016 | Ito | G01R 33/56 |
| 9,606,209 B2 | 3/2017 | Ernst et al. | |
| 9,977,108 B2 | 5/2018 | Nehrke et al. | |
| 9,987,617 B1 | 6/2018 | Naushad et al. | |
| 10,641,853 B2 | 5/2020 | Du et al. | |
| 10,830,851 B2 | 11/2020 | Wald et al. | |
| 10,890,631 B2 | 1/2021 | Wang et al. | |
| 11,474,173 B2 | 10/2022 | Vester et al. | |
| 11,579,219 B2 | 2/2023 | Wang | |
| 2011/0211744 A1 | 9/2011 | Darrow et al. | |
| 2012/0271571 A1 | 10/2012 | Bulumulla et al. | |

(Continued)

FOREIGN PATENT DOCUMENTS

WO    2008135872 A1    11/2008

OTHER PUBLICATIONS

Sacolick et al., "B1 Mapping by Bloch-Siegert Shift", Magnetic Resonance in Medicine, 2010, pp. 1315-1322.

(Continued)

*Primary Examiner* — Gregory H Curran
(74) *Attorney, Agent, or Firm* — Maier & Maier, PLLC

(57) ABSTRACT

A method and system for modifying a series of magnetic resonance imaging (MRI) scan sequences for use in a single MRI examination. In one embodiment, a method and system intersperse a set of B1 amplitude measurement sequences within a received series of MRI scan sequences such that an RF parameter value of at least one scan sequence of the received series of MRI scan sequences is altered based on the results of at least one of the interspersed set of B1 amplitude measurement sequences.

20 Claims, 18 Drawing Sheets

(56) References Cited

U.S. PATENT DOCUMENTS

| | | |
|---|---|---|
| 2013/0249553 A1 | 9/2013 | Simonetti et al. |
| 2013/0251227 A1 | 9/2013 | Wang et al. |
| 2014/0103925 A1 | 4/2014 | Hancu et al. |
| 2014/0105476 A1 | 4/2014 | Bulumulla et al. |
| 2014/0171784 A1 | 6/2014 | Ooi et al. |
| 2014/0350439 A1 | 11/2014 | Zur et al. |
| 2015/0002149 A1 | 1/2015 | Nehrke et al. |
| 2015/0309141 A1 | 10/2015 | Kim et al. |
| 2016/0018502 A1 | 1/2016 | Wang et al. |
| 2016/0187438 A1 | 6/2016 | Gui et al. |
| 2018/0067176 A1 | 3/2018 | Weingartner et al. |
| 2018/0246178 A1 | 8/2018 | Wang et al. |
| 2020/0049786 A1 | 2/2020 | Venkatachari et al. |
| 2020/0142057 A1 | 5/2020 | Pendse et al. |
| 2020/0319367 A1 | 10/2020 | Xing et al. |
| 2020/0319372 A1 | 10/2020 | Jachmann et al. |
| 2020/0341090 A1 | 10/2020 | Reeder et al. |
| 2020/0393526 A1 | 12/2020 | Wang |
| 2021/0018583 A1 | 1/2021 | Gui et al. |
| 2021/0208219 A1 | 7/2021 | Vester et al. |
| 2022/0026511 A1 | 1/2022 | Venkatachari et al. |
| 2022/0397621 A1 | 12/2022 | Tang et al. |

OTHER PUBLICATIONS

Khalighi et al., "RF Pulse Optimization for Bloch-Siegert B+1 Mapping", Magnetic Resonance in Medicine, 2012, pp. 857-862.

Sacolick et al., "Fast Radiofrequency Flip Angle Calibration by Bloch-Siegert Shift", Magnetic Resonance in Medicine, 2011, pp. 1333-1338.

Lesch et al., "Ultrafast 3D Bloch-Siegert B+1-mapping using variational modeling", Magnetic Resonance in Medicine, 2018, pp. 881-892.

Corbin et al., "Robust 3D Bloch-Siegert based B+1 mapping using multi-echo general linear modeling", Magnetic Resonance in Medicine, 2019, pp. 2003-2015.

Zanchi et al., "Frequency-Offset Cartesian Feedback for MRI Power Amplifier Linearization", IEEE Trans Med Imaging, 2011, vol. 30, No. 2, pp. 512-522.

* cited by examiner

| CT₁ | | | | | | | |
|---|---|---|---|---|---|---|---|
| 1.0 | 1.0 | 1.0 | 1.0 | 1.0 | 1.0 | 1.0 | 1.0 |

FIG. 13A

| CT₂ | | | | | | | |
|---|---|---|---|---|---|---|---|
| V3 | V3 | V3 | V2 | V2 | V2 | V2 | V2 |

FIG. 13B

| CT₃ | | | | | | | |
|---|---|---|---|---|---|---|---|
| V4 | V4 | V4 | V4 | V5 | V5 | V5 | V5 |

FIG. 13C

| CT₄ | | | | | | | |
|---|---|---|---|---|---|---|---|
| V17 | V16 | V15 | V14 | V13 | V12 | V11 | V10 |

FIG. 13D high     med.     low

MAGNETIC RESONANCE IMAGING METHOD, SYSTEM, AND COMPUTER PROGRAM PRODUCT UTILIZING B1 AMPLITUDE-BASED CORRECTIONS

BACKGROUND OF THE INVENTION

Field of the Invention

This disclosure relates to a method, system, and computer program product for modifying a portion of a series of magnetic resonance imaging (MRI) scan sequences for use in a single MRI examination, and, in one embodiment, to a method and system for performing at least one B1 amplitude measurement sequence interspersed within a series of MRI scan sequences such that an RF parameter value (e.g., a flip angle or a transmit amplifier gain) of at least one scan sequence of the series of MRI scan sequences is altered based on the results of performing the at least one interspersed B1 amplitude measurement sequence.

Discussion of the Background

When using MRI systems to perform imaging on a patient, a patient enters the gantry of an MRI system and is subjected to an examination including a series of scan sequences (shown in FIG. 1 as scan sequence$_1$ to scan sequence$_n$) with each scan sequence including a number of shots (shown as m shots for scan sequence$_2$). Having finished the series of scan sequences in the patient exam, a patient exits the MRI system.

Known MRI systems perform a per-patient calibration to determine a reference RF transmitter gain level (RFL) prior to beginning an examination as shown in the pre-scan sequence of FIG. 1. The reference RFL value is used to calculate the transmitter gain values to achieve the intended B1 amplitude for all subsequent RF pulses in the MR scan sequences. As would be appreciated by those skilled in the art, the B1 amplitude of the RF pulses has a direct relationship with the flip angle of the RF pulse, and the flip angle of the RF pulse is a primary determinant of MR signal intensity and image contrast. Thus, the RFL value has a known, and direct relationship, to B1 field and flip angle. By measuring the B1 field, we can directly and simply calculate RFL.

RFL is known to be influenced by loading of the Tx coil including (a) patient loading and (b) receiver coil absorption. RFL also is affected by power efficiency (transmission/reflection) which may be affected by thermal status of: (1) TxCoils, (2) RF shields, (3) RF amplifiers, and (4) gradient coils.

Sacolick et al. proposed in Magnetic Resonance in Medicine 66:1333-1338 (2011) (incorporated herein by reference), using a Bloch-Siegert Shift (BSS) method for RFL calibration. They describe an "automated prescan" for "preparation [of an] MRI scan" in which "the magnitude of the $B_1^+$ field" is measured "for transmit gain (TG) to flip angle calibration" noting that the "relationship between the radiofrequency (RF) power output to the transmit coil and the B1 field produced depends on the size, orientation, geometry, and composition of the patient . . . . One measures the flip angle or B1 transmit field magnitude for one or more starting system TG levels and calculates the adjustment necessary to produce an RF pulse of a desired flip angle or $B_1^+$ field."

BRIEF DESCRIPTION OF THE DRAWINGS

A more complete understanding of this disclosure is provided by reference to the following detailed description when considered in connection with the accompanying drawings, wherein:

FIGS. 13A-13D show changes in a correction table internal to an RF transmitter for indirectly modifying scan sequences as a result of B1 amplitude measurement sequences.

DETAILED DESCRIPTION

Figure 1:
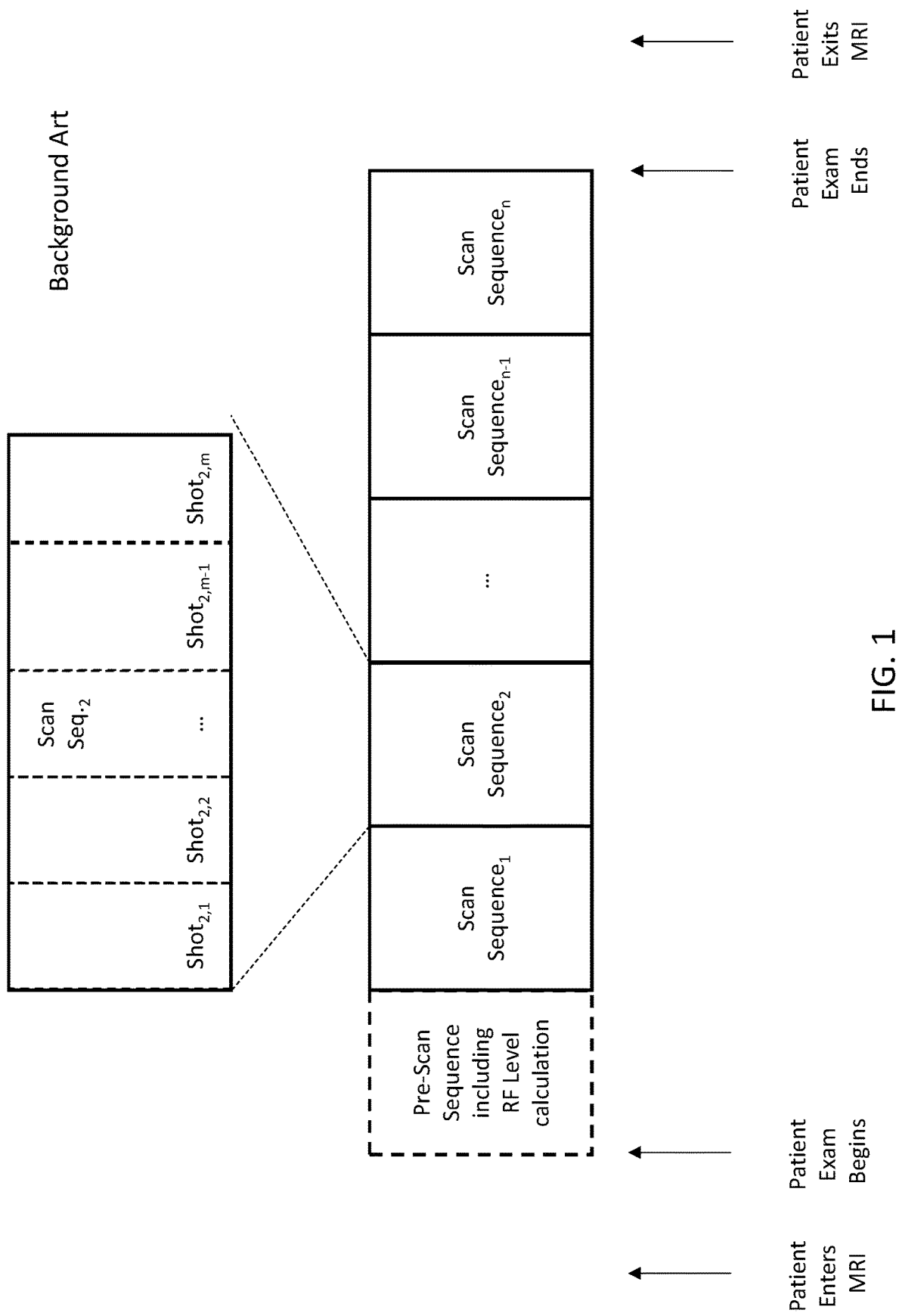
FIG. 1 illustrates a patient examination including (a) an optional pre-scan and (b) a series of scan sequences with each scan sequence including a series of shots.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes, systems and computer program products provided in particular implementations. However, the processes, systems, and computer program products will operate effectively in other implementations. Phrases such as 'an embodiment', 'one embodiment', and 'another embodiment' can refer to the same or different embodiments. The embodiments will be described with respect to methods and compositions having certain components. However, the methods and compositions can include more or less components than those shown, and variations in the arrangement and type of the components can be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range—is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. Any definitions are intended to aid the reader in understanding the present disclosure, but are not intended to vary or otherwise limit the meaning of such terms unless specifically indicated.

Figure 2:
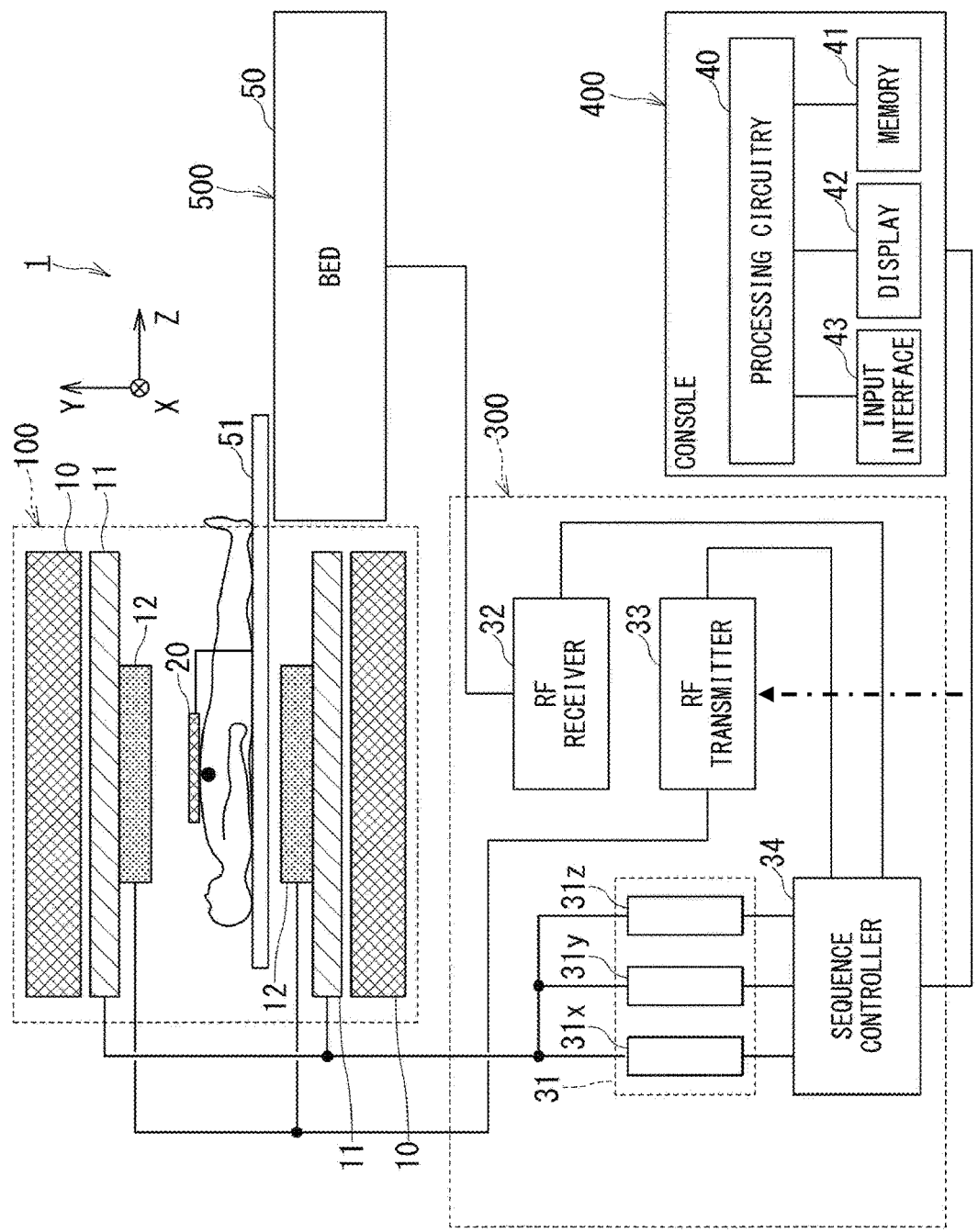
FIG. 2 illustrates a schematic block diagram of an MRI system according to an exemplary implementation of the present disclosure.

Referring now to the drawings, wherein like reference numerals designate identical or corresponding parts throughout the several views, FIG. 2 is a block diagram illustrating an overall configuration of an MRI apparatus 1 according to the first embodiment. The MRI apparatus 1 of the first embodiment includes a gantry 100, a control cabinet 300, a console 400, and a bed 500.

The gantry 100 includes a static magnetic field magnet 10, a gradient coil assembly 11, and a whole body (WB) coil 12, and these components are housed in a cylindrical housing. The bed 500 includes a bed body 50 and a table 51. In addition, the MRI apparatus 1 includes at least one RF coil 20 to be disposed close to an object.

The control cabinet 300 includes three gradient coil power supplies 31 (31 x for an X-axis, 31 y for a Y-axis, and 31 z for a Z-axis), an RF receiver 32, an RF transmitter 33, and a sequence controller 34.

The static magnetic field magnet 10 of the gantry 100 is substantially in the form of a cylinder, and generates a static magnetic field inside a bore, which is a space formed inside the cylindrical structure and serves as an imaging region of the object (for example, a patient). The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current to be provided from a static magnetic field power supply (not shown) in an excitation mode. Afterward, the static magnetic field magnet 10 shifts to a permanent current mode, and the static magnetic field power supply is separated. Once it enters the permanent current mode, the static magnetic field magnet 10 continues to generate a strong static magnetic field for a long time, for example, over one year. Note that the static magnetic field magnet 10 may be configured as a permanent magnet.

The gradient coil assembly 11 is also substantially in the form of a cylinder and is fixed to the inside of the static magnetic field magnet 10. The gradient coil assembly 11 has a three-channel structure and includes an X-axis gradient coil 11 x, a Y-axis gradient coil 11 y, and a Z-axis gradient coil 11 z (not shown individually). The X-axis gradient coil 11 x is supplied with electric current from the gradient magnetic field power supply 31 x so as to generate a gradient magnetic field Gx in the X-axis direction. The Y-axis gradient coil 11 y is supplied with electric current from the gradient magnetic field power supply 31 y so as to generate a gradient magnetic field Gy in the Y-axis direction. The Z-axis gradient coil 11 z is supplied with electric current from the gradient magnetic field power supply 31 z so as to generate a gradient magnetic field Gz in the Z-axis direction.

The bed body 50 of the bed 500 can move the table 51 in the vertical direction and in the horizontal direction. The bed body 50 moves the table 51 with an object placed thereon to a predetermined height before imaging. Afterward, when the object is imaged, the bed body 50 moves the table 51 in the horizontal direction so as to move the object to the inside of the bore.

The WB body coil 12 is shaped substantially in the form of a cylinder so as to surround the object, and is fixed to the inside of the gradient coil assembly 11. The WB coil 12 applies RF pulses to be transmitted from the RF transmitter 33 to the object, and receives magnetic resonance (MR) signals emitted from the object due to excitation of hydrogen nuclei.

The RF coil 20 receives MR signals emitted from the object at a position close to the object. The RF coil 20 includes plural coil elements, for example. Depending on the anatomical imaging part of the object, there are various RF coils 20 such as for the head, for the chest, for the spine, for the lower limbs, and for the whole body. Of these various RF coils, FIG. 2 illustrates the RF coil 20 for imaging the chest.

The RF transmitter 33 transmits an RF pulse to the WB coil 12 on the basis of an instruction from the sequence controller 34. The RF receiver 32 detects MR signals received by the WB coil 12 and/or the RF coil 20, and transmits raw data obtained by digitizing the detected MR signals to the sequence controller 34.

The sequence controller 34 performs a scan of the object by driving the gradient coil power supplies 31, the RF transmitter 33, and the RF receiver 32 under the control of the console 400. When the sequence controller 34 receives the raw data from the RF receiver 32 by performing the scan, the sequence controller 34 transmits the received raw data to the console 400.

The sequence controller 34 includes processing circuitry (not shown). This processing circuitry is configured as, for example, a processor for executing predetermined programs or configured as hardware such as a field programmable gate array (FPGA) and an application specific integrated circuit (ASIC).

The console 400 is configured as a computer that includes processing circuitry 40, a memory 41, a display 42, and an input interface 43.

The memory 41 is a recording medium including a read-only memory (ROM) and a random access memory (RAM) in addition to an external memory device such as a hard disk drive (HDD) and an optical disc device. The memory 41 stores various programs to be executed by a processor of the processing circuitry 40 as well as various data and information.

The display 42 is a display device such as a liquid crystal display panel, a plasma display panel, and an organic EL panel.

The input interface 43 includes various devices for an operator to input various data and information, and is configured of, for example, a mouse, a keyboard, a trackball, and/or a touch panel.

The processing circuitry 40 is, for example, a circuit provided with a central processing unit (CPU) and/or a special-purpose or general-purpose processor. The processor implements various functions described below by executing the programs stored in the memory 41. The processing circuitry 40 may be configured of hardware such as an FPGA and an ASIC. The various functions described below can also be implemented by such hardware. Additionally, the processing circuitry 40 can implement the various functions by combining hardware processing and software processing based on its processor and programs.

The console 400 controls the entirety of the MRI apparatus 1 with these components. Specifically, the console 400 accepts imaging conditions such as the type of pulse sequence, various information, and an instruction to start imaging to be inputted by a user such as a medical imaging technologist through the input interface 43 including a mouse and a keyboard. The processing circuitry 40 causes the sequence controller 34 to perform a scan on the basis of the inputted imaging conditions and reconstructs an image on the basis of the raw data transmitted from the sequence controller 34, i.e., digitized MR signals. The reconstructed image is displayed on the display 42 and is stored in the memory 41.

In the configuration of the MRI apparatus 1 shown in FIG. 2, the control cabinet 300, the gantry 100, and the bed 500 (i.e., all the components except the console 400) constitute an imaging unit or scanner.

Figure 3A:
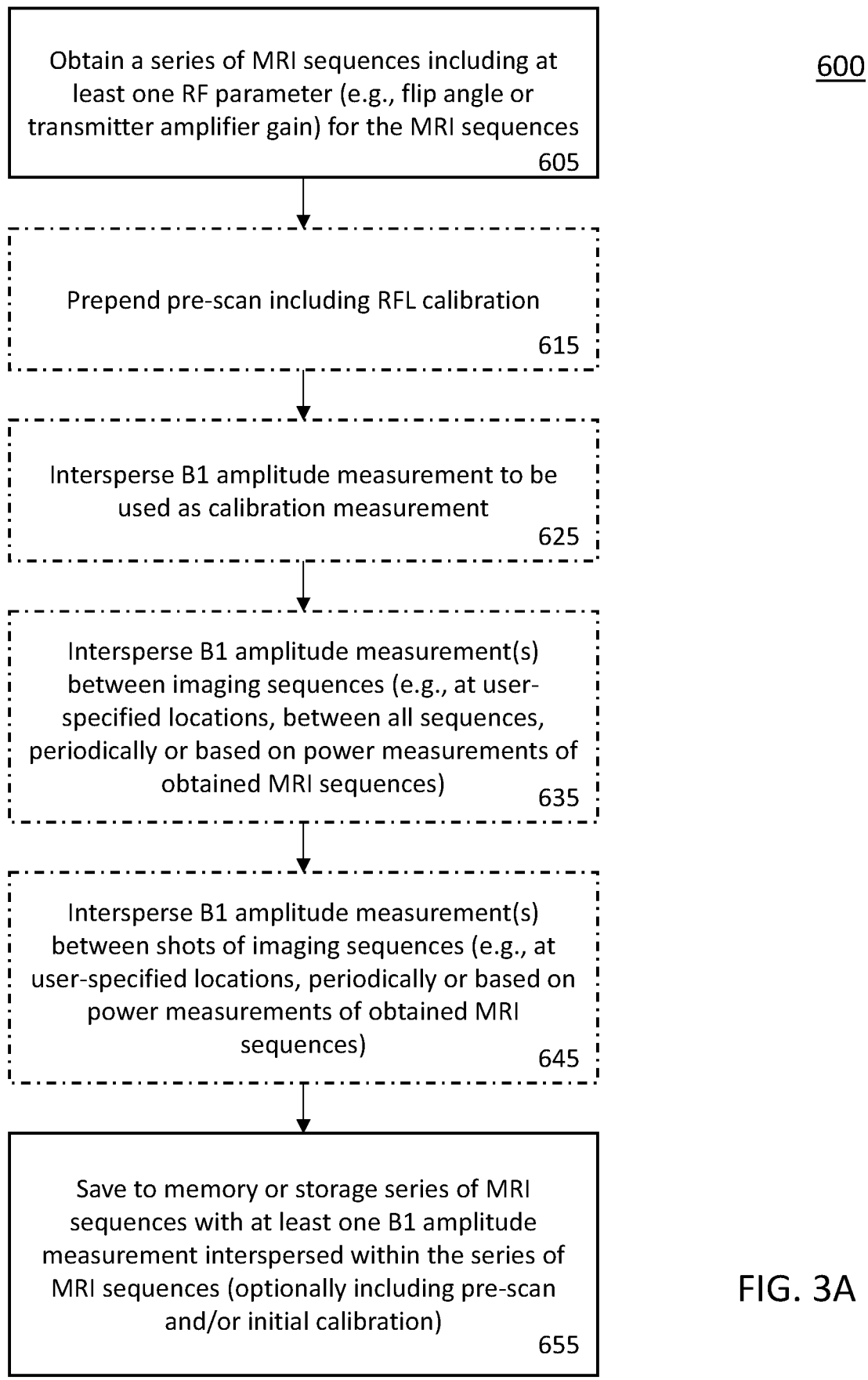
FIG. 3A illustrates a flowchart showing exemplary processing steps for interspersing at least one B1 amplitude measurement within a series of MRI scan sequences.

To control the MRI apparatus 1 to perform imaging, a series of MRI scan sequences are fed to the sequence controller 34. FIG. 3A illustrates a flowchart showing exemplary processing steps for interspersing at least one B1 amplitude measurement within a series of MRI scan sequences. A method 600 begins by obtaining a series of MRI sequences including at least one RF parameter (e.g., flip angle or transmitter amplifier gain) for the MRI sequences, as described at Step 605. A series of optional steps are then performed to intersperse the at least one B1 amplitude measurement in the series of MRI scan sequences. Not all steps need be executed as the series of MRI scan sequences ends up having at least one B1 amplitude measurement interspersed therein.

Step 615 shows an optional step of prepending the series of MRI scan sequences with a pre-scan that includes an RF level calibration therein (potentially as part of other pre-scan processing). Step 625 shows an optional step of adding a B1 amplitude measurement that is itself to be used for a RF level calibration for other B1 amplitude measurements added in steps 635 and 645.

Figure 6:
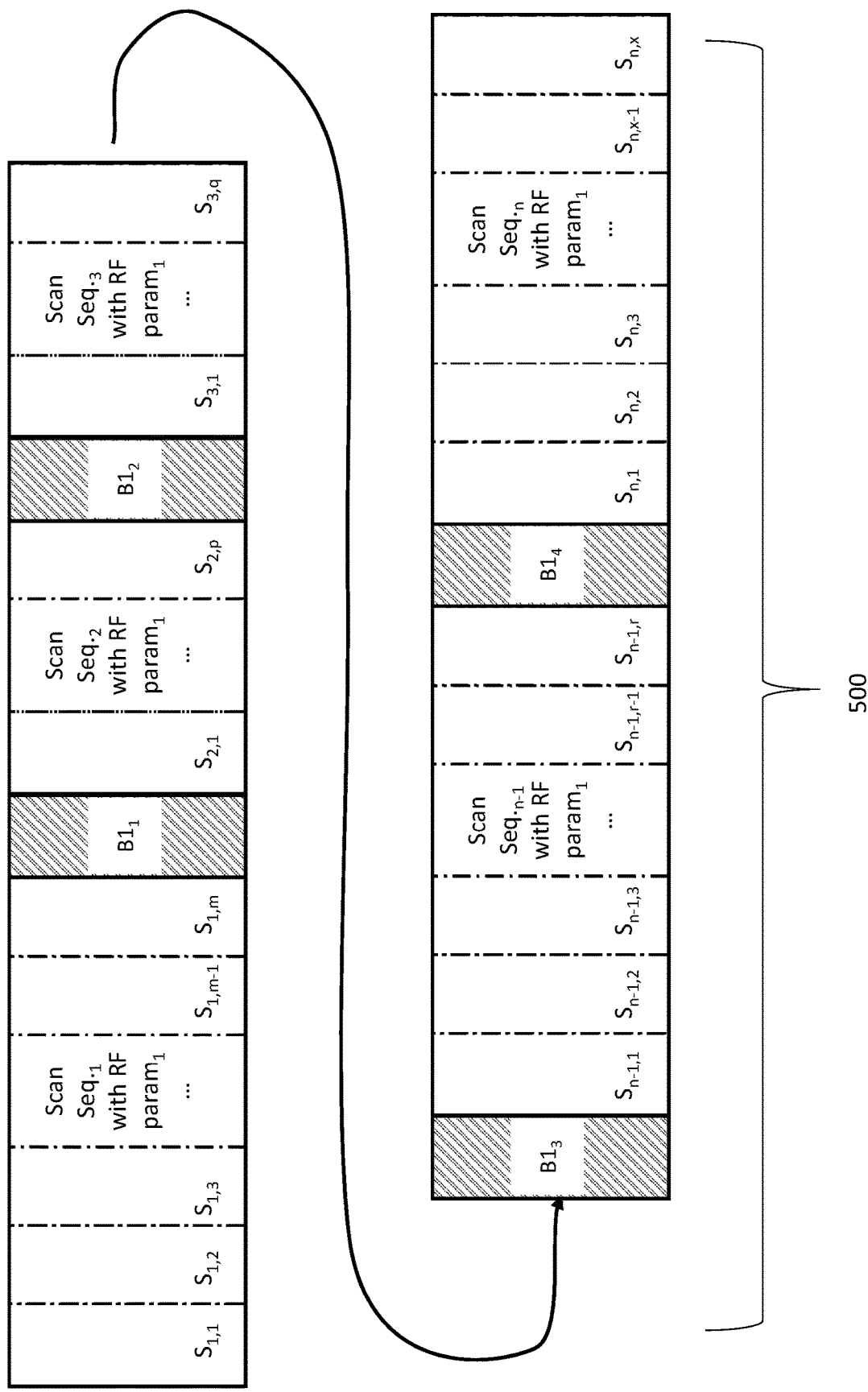
FIG. 6 illustrates the series of scan sequences of FIG. 4 that has been augmented with an interspersed series of B1 amplitude measurement sequences such that each of the scan sequences (after the first scan) is preceded by a B1 amplitude measurement sequence.

Step 635 shows an optional step of interspersing B1 amplitude measurement(s) between imaging sequences (e.g., at user-specified locations, between all sequences, periodically or based on power measurements of obtained MRI sequences) as will be described in greater detail with respect to FIGS. 6 and 7. Step 645 shows an optional step of interspersing B1 amplitude measurement(s) between shots of imaging sequences (e.g., at user-specified locations, periodically or based on power measurements of obtained MRI sequences) as described in greater detail with respect to FIG. 9.

After the process of interspersing has been performed, control passes to step 655. In step 655, the resulting series of MRI sequences (with at least one B1 amplitude measurement interspersed within the series of MRI sequences (optionally including pre-scan and/or initial calibration)) is saved to memory or storage.

The resulting series of MRI scan sequences interspersed with at least one B1 amplitude sequence is stored in a computer storage device that is accessible by the MRI apparatus 1 such that the resulting series can be obtained by the MRI apparatus 1 and read into its memory 41.

Figure 3B:
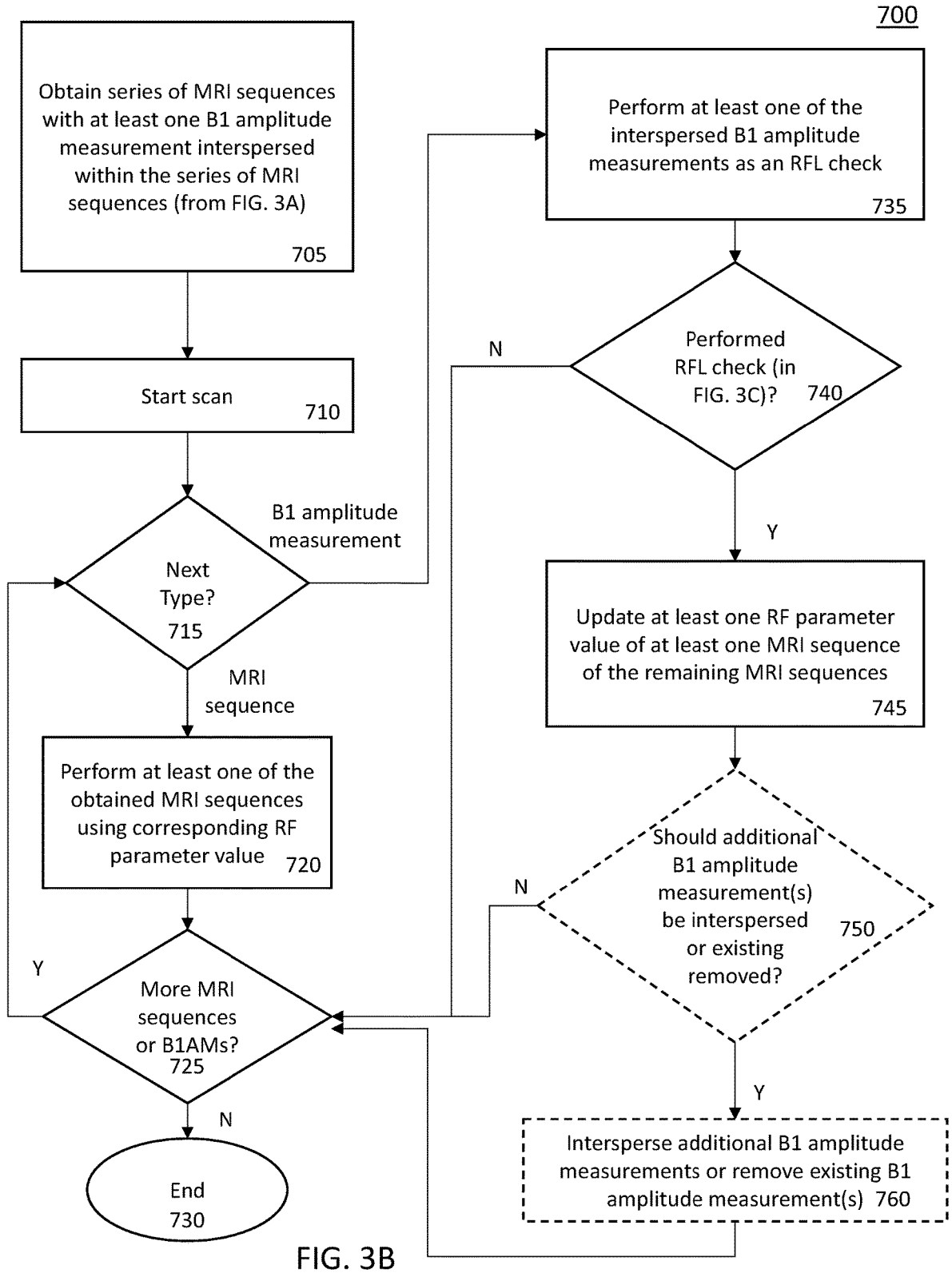
FIG. 3B illustrates a flowchart showing exemplary processing steps for executing at least one B1 amplitude measurement sequence interspersed within a series of MRI scan sequences such that an RF parameter value (e.g., a flip angle or a transmit amplifier gain) of at least one scan sequence of the series of MRI scan sequences is altered based on the results of performing the at least one interspersed B1 amplitude measurement sequence.

FIG. 3B illustrates a flowchart showing (together with FIG. 3C) exemplary processing steps for performing at least one B1 amplitude measurement sequence interspersed within a series of MRI scan sequences such that an RF parameter value (e.g., a flip angle or a transmit amplifier gain) of at least one scan sequence of the series of MRI scan sequences is altered based on the results of performing the at least one interspersed B1 amplitude measurement sequence. The process 700 begins with obtaining a series of MRI sequences with at least one B1 amplitude measurement interspersed within the series of MRI sequences as described at Step 705. In one embodiment, the series of MRI sequences additionally includes at least one of pre-scan MRI sequences or a RF calibration sequence. The purpose of the RF calibration sequence is to calibrate the RF transmit amplifier output to achieve intended B1 amplitudes of the RF pulses in the subsequent MRI scan sequences. However, the pre-scan MRI sequences and a RF calibration sequence are optional. For example, a system-wide calibration can be used to determine a patient-independent calibration value. Alternatively, as part of a pre-scan a patient-specific calibration sequence can be performed. As used herein, "obtained" is intended to mean received from a memory 41 or storage system of the MRI system 1 or received from an external source in its entirety. "Obtained" is also intended to mean that a portion of the information is obtained from one source and then augmented with additional information such that the combined information is then accessible to the MRI system 1 (e.g., stored in the memory 41 or in a storage system of the MRI system 1). For example, the series of MRI sequences may be obtained from one source (memory 41 or an external device) and then augmented with additional information such as the at least one B1 amplitude measurement which is then interspersed within the series of MRI sequences.

Having obtained the at least one B1 amplitude measurement interspersed with the series of MRI sequences, the method starts the scan in step 710 to begin the execution of the MRI sequences and the at least one B1 amplitude measurement. In step 715, the method determines what the next type is in the sequence that should be executed. If step 715 determines that the next type is part of the MRI sequence, then control passes to step 720, and the next portion of the MRI sequence is performed. After performing that part of the MRI sequence, control passes to step 725 where the process determines if there is anything more to be performed from the MRI sequence or the at least one B1 amplitude measurement (B1AM). If there is nothing else to be performed, the method passes control to step 730, and the imaging process for the patient is complete. However, if portions of the MRI sequence or the at least one B1 amplitude measurement still need to be performed, control passes from 725 back to 715.

If the method determines at step 715 that the next type is part of the at least one B1 amplitude measurement, then control passes to step 735 where the current portion of the at least one B1 amplitude measurement is performed (along with any other consecutive B1 amplitude measurements in the sequence) as an RFL check. Control then passes to step 740 where the method determines if a result of the at least one B1 amplitude measurement (along with any other consecutive B1 amplitude measurements in the sequence) indicates that changes in an RF parameter value (e.g., a flip angle or a transmit amplifier gain) are needed for at least a portion of the remaining MRI sequence that has not yet been performed. In general, if the values of the measured and calibrated RF values differ by more than a threshold amount (or if a mathematical function of the two values differs by more than a threshold amount) then a change is determined to be needed.

Figure 3C:
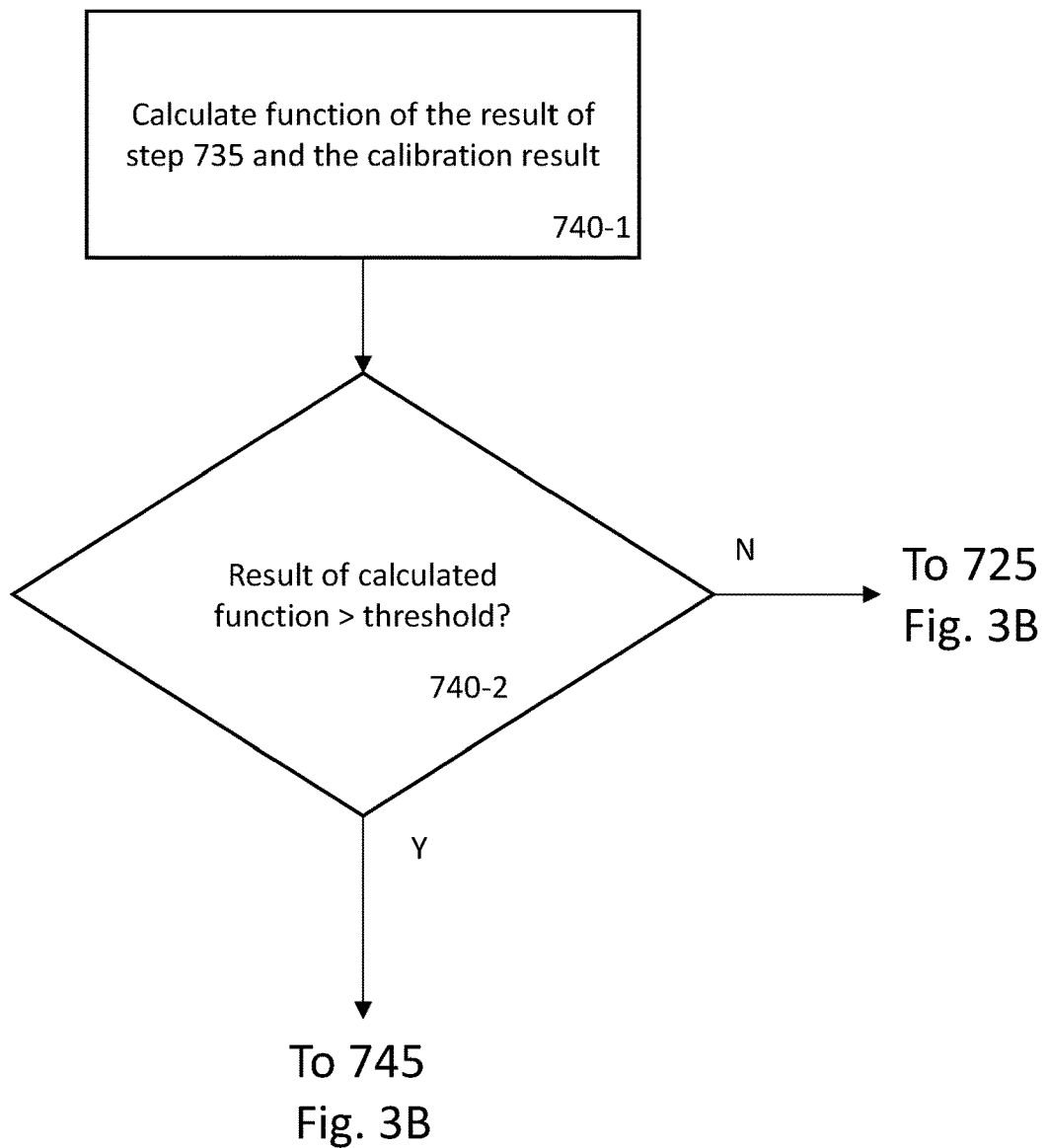
FIG. 3C is a flowchart showing additional details of step 740 of FIG. 3B.

As shown in FIG. 3C, such a determination can be made by first calculating, in step 740-1, a function (e.g., difference, linear function, or non-linear function) of the result of step 335 and the calibration result. Control then passes to step 740-2 where a result of the calculated function is compared against a threshold. As described above, the calibrated value can be determined in a patient-independent manner (e.g., a system-wide constant is used for all patients). The calibrated value also can be determined as part of a patient pre-scan. In yet another embodiment, the expected amount can be determined using an earlier B1 amplitude measurement.

If the result of the at least one B1 amplitude measurement indicates that changes in an RF parameter value are not needed, then control passes from step 740-2 to step 725 to see if there is more to be processed. If the result of the at least one B1 amplitude measurement indicates that changes in an RF parameter value are needed, then control passes from step 740-2 to step 745. In step 745, the method updates at least one RF parameter value of at least one MRI sequence of the remaining MRI sequences.

After step 745 has been performed, in a first embodiment control passes over optional steps 750 and 760 to step 725 to see if there is more to be processed. Alternatively, in a second embodiment utilizing dynamic interspersing, control passes from step 745 to step 750. In step 750, the method determines if additional B1 amplitude measurements should be interspersed (e.g., because the remaining portion of the MRI sequences is longer than a threshold time, because a comparison function of the two values is larger than a threshold different than the threshold used for changes generally, or a combination of the two methods) or if existing B1 amplitude measurements should be removed (e.g., if the two values indicate that the expected and measured B1 amplitude is close (<1%-2%). Embodiments can add or remove B1 amplitude measurements or both. If B1 amplitude measurements should be added and/or deleted, control passes from step 750 to step 760 to effectuate the changes and then to step 725; otherwise control passes directly from 750 to 725.

Figure 4:
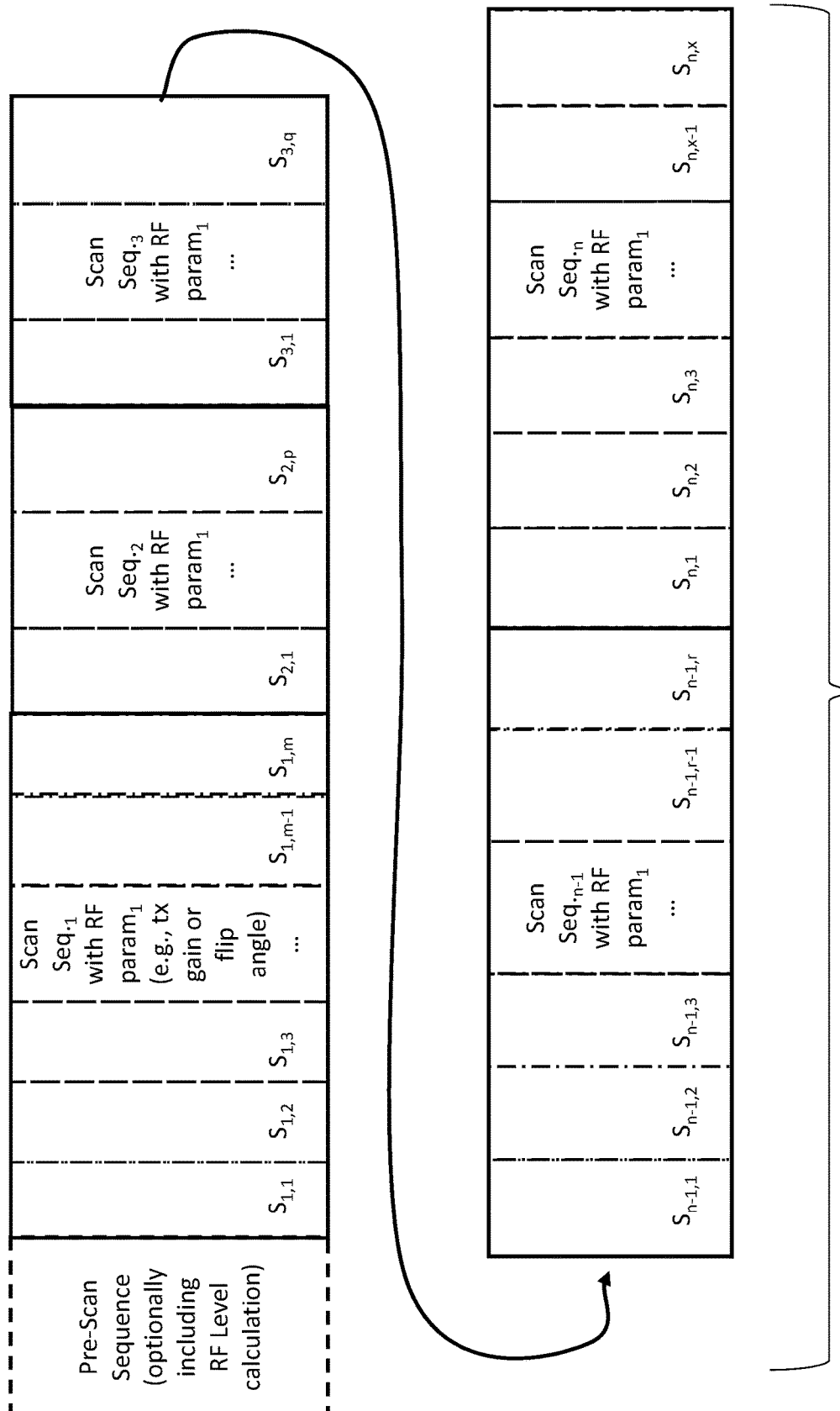
FIG. 4 illustrates an initial series of scan sequences specified for a patient examination prior to interspersing any B1 amplitude measurement sequences.

FIG. 4 illustrates an optional pre-scan and an initial series of scan sequences 400 specified for a patient examination prior to interspersing any B1 amplitude measurements. The initial series of scan sequences often is specified by a medical professional and designed to scan particular areas with a particular set of scanning parameters. For example, a medical professional could order a T2-weighted (T2 W) scan of a first area, followed by a T1-weighted (T1 W) scan of the first area and then a second area, followed by a fluid-attenuated inversion recovery (FLAIR) scan of the first area, followed by any other desired scans. Each of the illustrated scans is illustrated as utilizing more than one shot ($S_{x,y}$, where x is the scan sequence and y is the shot number within the sequence), and each of the scans may include different numbers of shots (including as few as one shot). The relative lengths of the scans in FIGS. 4-6 are not intended to connote relative lengths but rather the use of the ellipse ( . . . ) in those figures is intended to indicate a hidden arbitrary number of shots to allow the figures to be less cluttered. The set of scan sequences are illustrated as including an initially specified set of RF parameters that are to be used in the performance of the scan sequences. Such RF parameters include, but are not limited to, flip angles and amplifier gains for the RF transmitter 134 (including a variable gain amplifier).

Figure 5A:
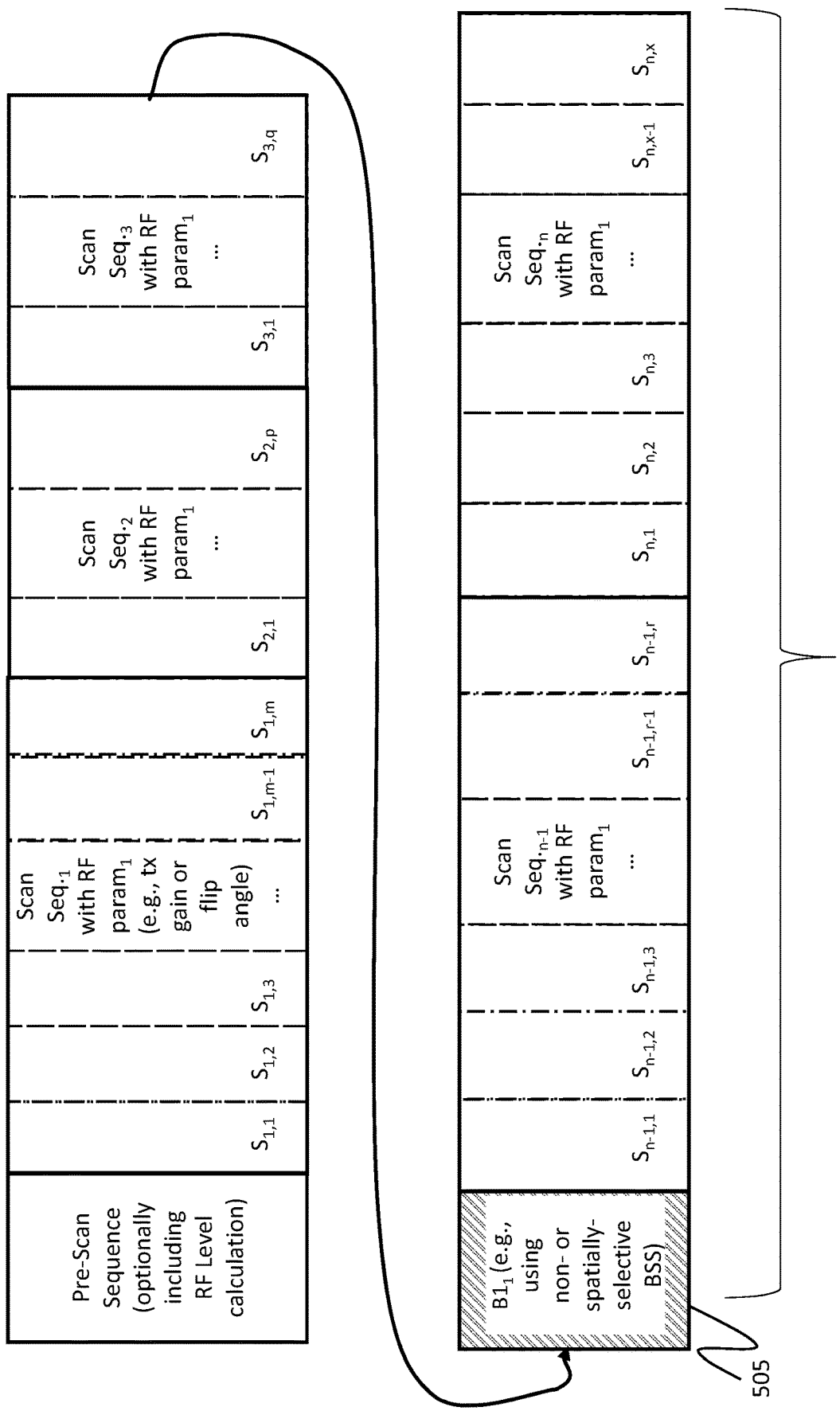
FIG. 5A illustrates the series of scan sequences of FIG. 4 that has been augmented with a first B1 amplitude measurement sequence and that further utilizes a patient pre-scan to obtain an RFL calibration.

FIG. 5A illustrates a pre-scan (including an RF level calibration sequence) and the series of scan sequences of FIG. 4 that has been augmented with a first B1 amplitude measurement sequence to form an augmented series of scan sequences 500. The inclusion of the B1 amplitude measurement allows the method to detect changes (e.g., due to heat) in system components (e.g., a transmit coil (TxCoil) or a whole body RF coil 115, RF shield, RF amplifier (included in RF transmitter 134)) can heat during the course of an examination. Due to the influence of heating, efficiency of those components is affected resulting changes in transmission/reflection ratio. Therefore, an RFL obtained during a pre-scan could be inaccurate for use later in the examination. Inaccurate RFL values result in incorrect flip angle setting which affects image quality. Hardware and patient safety measurements (SAR, B1rms, receiver coil power absorption) rely on properly calibrated RFL values. Therefore, the safety measurements may become inaccurate as well.

Figure 5B:
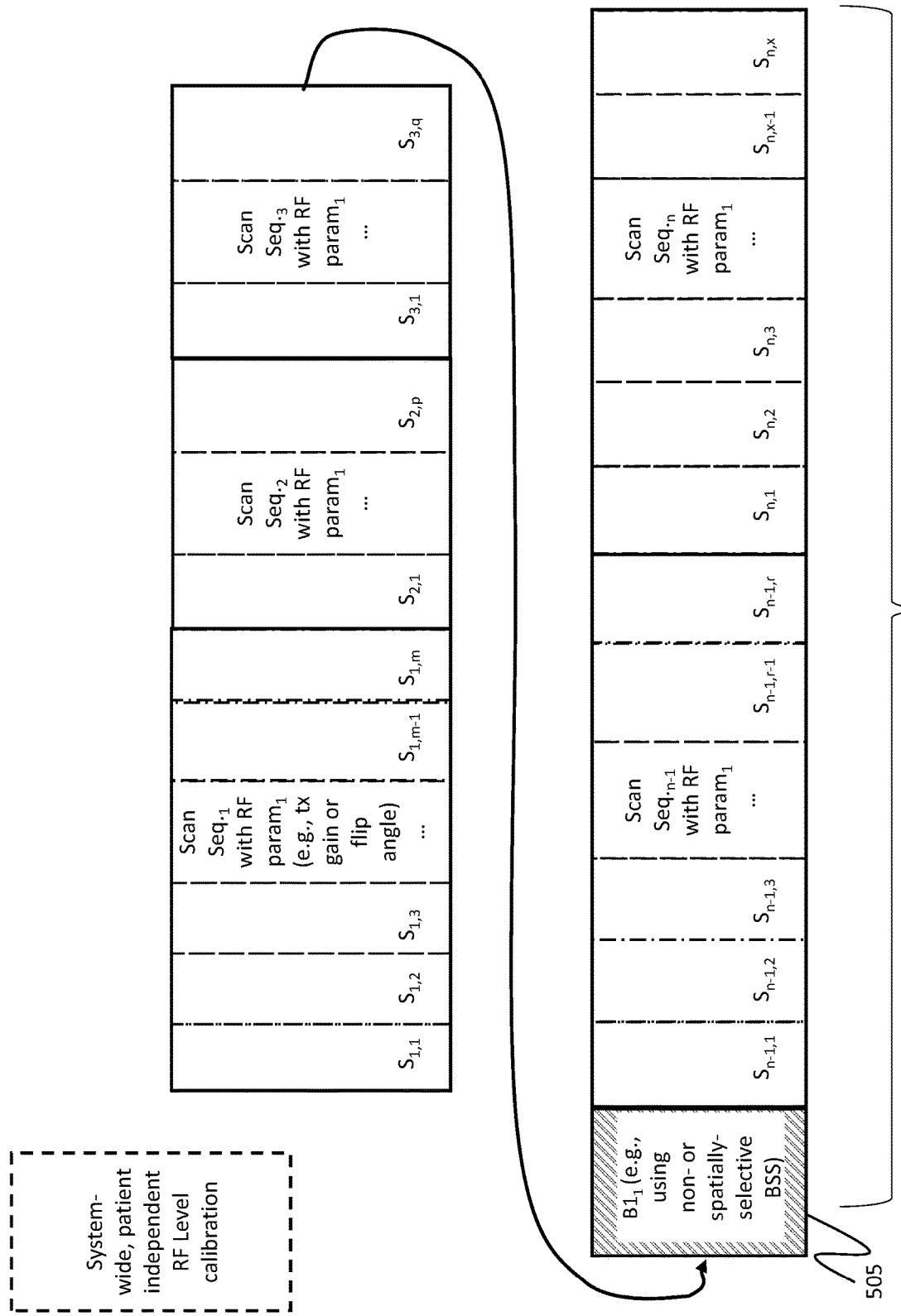
FIG. 5B illustrates the series of scan sequences of FIG. 4 that has been augmented with a first B1 amplitude measurement sequence but does not use a patient pre-scan to obtain RFL calibration.

As shown in FIG. 5B, the RFL calibration value need not be obtained during a pre-scan. Instead, a system-wide, patient-independent RF calibration value can be obtained and used for all patients for which an RFL calibration is not performed prior to an imaging sequence. The system-wide, patient-independent RF calibration value may be obtained by using an average value for a number of patients or by modeling the transmission characteristics of the system. In yet another embodiment, a first B1 amplitude measurement taken during an imaging process can be used to calculate a calibration RFL (e.g., before the transmitter gets overheated), and then the results of subsequent B1 amplitude measurements can utilize the results of the first B1 amplitude measurements as the calibration value.

Methods described herein can be used to track and correct for changes in hardware conditions, principally in components related to the transmit chain including TxCoil and RF power amplifier. In one use case, a method can be used to track changes in B1 (that indicate corresponding changes in RFL) caused by heating in the Tx coil. In the normal course of operation, a voltage is applied to the Tx coil to invoke a B1 magnetic field inside the subject. This B1 magnetic field causes an RF flip angle which can be used to generate an MR signal which can be used to create an image.

During the course of a scan, or a series of scans, the voltages applied to the Tx coil can cause the conductive elements in the Tx coil to thermally heat. This thermal heating will generally result in an increased resistance within the Tx coil, leading to a reduced coil transmission efficiency (called 'Q' of the coil), which results in a reduced B1 magnetic field within the subject for the same input power. Thus, B1 magnetic field in the subject can change based on the thermal condition of the Tx coil.

For the purposes of the initial RFL calibration, a search for the reference RFL value is typically performed (either system-wide or on a per-patient basis). In the search, multiple transmit gain levels are applied and the induced B1 field is measured. The B1 field either can be measured directly, using a technique like BSS, or measured indirectly based on the signal generated by the same, as in the case of methods like signal maximization. When searching for the reference RFL value, multiple shots of the B1 measurement may be applied. This may be done for averaging the measurements in order to achieve a more robust estimate of RFL or it may be done for the purposes of curve fitting to calculate the reference RFL. As described herein, such a multi-shot approach may be used to re-calibrate reference RFL. However, a single shot of the B1 measurement also may be acquired. With the single measurement approach, the measured B1 may be compared to previous measurement or measurements of B1. Thus, the relative change in B1 may be detected, which is proportional to the relative change in RFL.

As shown in FIGS. 5A and 5B, a B1 amplitude measurement sequence 505 (labeled $B1_1$) is inserted not as part of a pre-scan or an initial calibration but instead before at least one scan sequence (illustrated as the (n−1)st scan sequence) that is after the first scan sequence. By using a BSS sequence as the B1 amplitude measurement sequence, the B1 amplitude measurement sequence can be performed very quickly (e.g., in approximately 50 ms) by using two repetition times (TRs) (+/−BSS frequency offset) per shot. When the B1 amplitude measurement sequence is performed (step 335 FIG. 3A), the receiver 32 receives the measured result and calculates (step 340-1 of FIG. 3A) a function based on a result of the B1 amplitude measurement and a reference B1 measurement calculated at an earlier time (e.g., during a system-wide calibration, during a pre-scan or during a B1 amplitude measurement sequence that was inserted before the current one). The function can be as simple as a difference but may also be other linear and non-linear functions.

If the result of the calculated function is more than an absolute or percentage threshold amount (e.g., 5% of the reference B1 measurement) (step 340-2), then the system updates an internal RF level calibration value. The internal RF level calibration value can be used to calculate RF parameters (step 345) for subsequent sequences including (a) flip angles or (b) amplifier gains for the RF transmitter. Given that the RF parameters for subsequent sequences will be based on the most recent B1 measurements, the system automatically corrects for thermal conditions of the system (i.e., corrects for drift). The result is improved consistency of image quality (e.g., because more consistent flip angles produce more consistent image quality).

In one embodiment, the inserted B1 amplitude measurement sequence 505 is selected to utilize a power level of a scan sequence that the inserted B1 amplitude measurement sequence 505 precedes. For example, the power level of the B1 amplitude measurement sequence 505 (labeled $B1_1$) of FIGS. 5A and 5B would be similar to the power level to be applied in scan sequence (n−1). A similar power level means a similar operating range of the transmit amplifier is used in both sequences.

In addition, the system can utilize a physics model to receive at least one of a prediction and a correction of the RF parameter to be used in subsequent scans. The physics model may incorporate information on expected changes to the system during subsequent scan sequences (e.g., due to applied power expected for subsequent scan sequences) to calculate the resulting predictions and/or corrections.

Such an insertion may be either automatic based on criteria determined by the MRI system or may be selected by a technician (or other user) by using a user input device (e.g., a touchscreen, a pointing device, a pen device, or voice control). For example, a technician may select two adjacent scan sequences and then select a menu control (or vice versa) that causes the MRI system to insert a B1 amplitude measurement sequence between the selected scan sequences. The MRI sequence controller 34 therefore updates the pulses sent to the RF transmitter 33 to include the inserted B1 amplitude measurement sequences within the original series of scan sequences.

Although FIGS. 5A and 5B illustrate a single B1 amplitude measurement sequence being inserted, in fact, any number of B1 amplitude measurement sequences can be inserted. For example, FIG. 6 illustrates the series of scan sequences of FIG. 4 (without the pre-scan for clarity) having been augmented with a series of B1 amplitude measurement sequences such that each of the scan sequences (after the first scan) is preceded by a single-shot B1 amplitude measurement sequence. Thus, each adjacent pair of scan sequences of the five illustrated scan sequences has a corresponding B1 amplitude measurement sequence inserted therebetween. An operator could choose from a menu interface a menu option such as "Automatic RFL check between scan sequences" that would automatically insert the corresponding B1 amplitude measurement sequences between all pairs of adjacent sequences.

Figure 7:
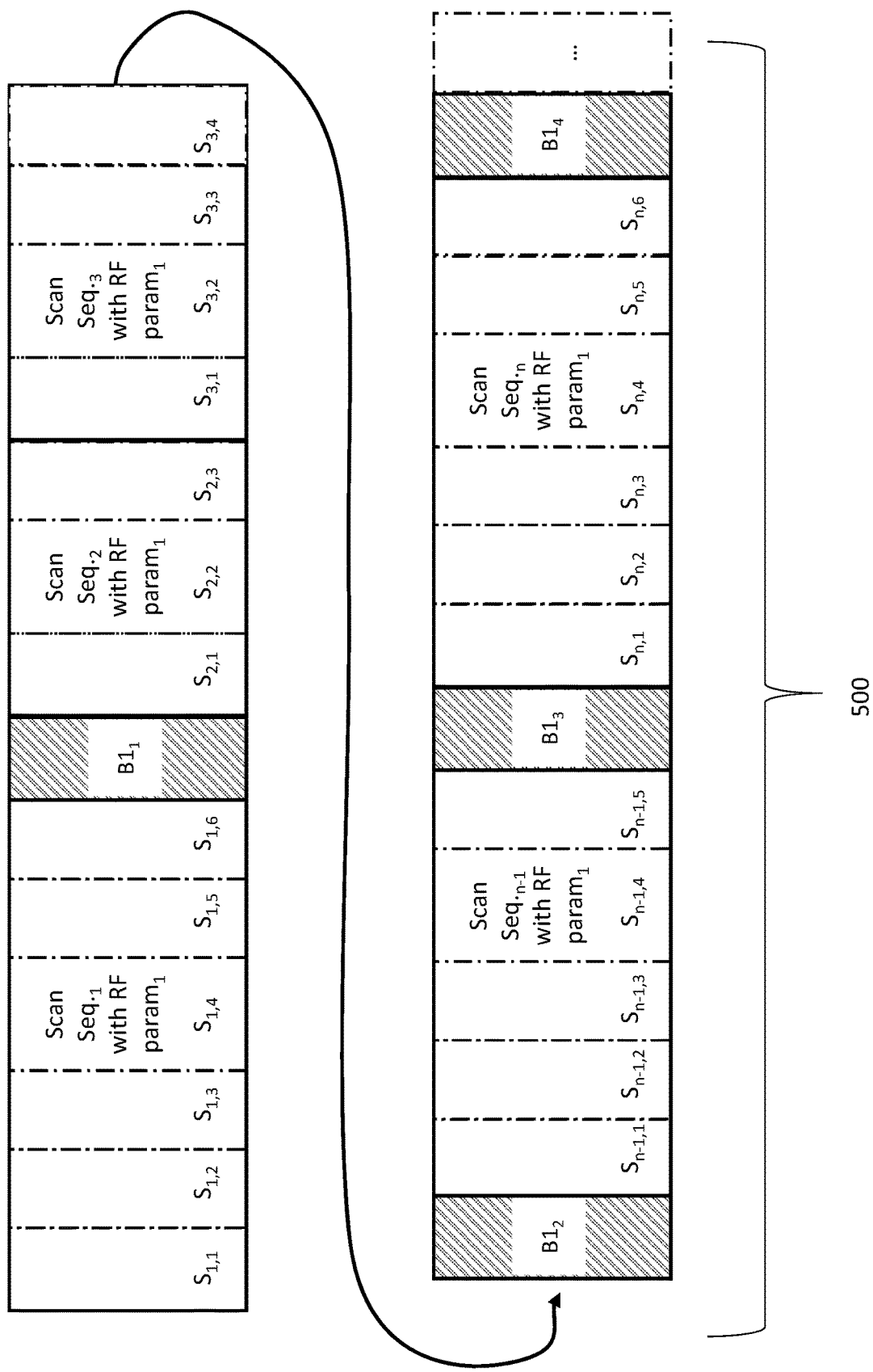
FIG. 7 illustrates the series of scan sequences that has been augmented with an interspersed series of B1 amplitude measurement sequences such that a B1 amplitude measurement sequence is inserted periodically within the series of scan sequences but between scan sequences of the series of scan sequences.

FIG. 7 illustrates the series of scan sequences of FIG. 4 (without the pre-scan for clarity) that has been augmented with a series of B1 amplitude measurement sequences such that a B1 amplitude measurement sequence is inserted periodically within the series of scan sequences but between scans of the series of scan sequences. As illustrated, the B1 amplitude measurement sequences are inserted about every "y" seconds where y is illustrated as corresponding to about 6 shot lengths. Since in this configuration the B1 amplitude measurement sequences are inserted between scan sequences, the timings between B1 amplitude measurement sequences can vary. As illustrated $B1_1$ and $B1_4$ are inserted after six shots, but $B1_2$ and $B1_3$ are inserted after 7 and 5 shots, respectively, because there were no earlier inter-scan sequence gaps in which to insert them. Other alternative locations in which B1 amplitude measurement sequences can be inserted include, but are not limited to, (1) after an absolute or relative threshold change in an RF power level of a portion of a scan sequence compared to an earlier time period and (2) after an absolute or relative threshold change in an average RF power level of a portion of a scan sequence compared to an earlier time period.

Figure 8A:
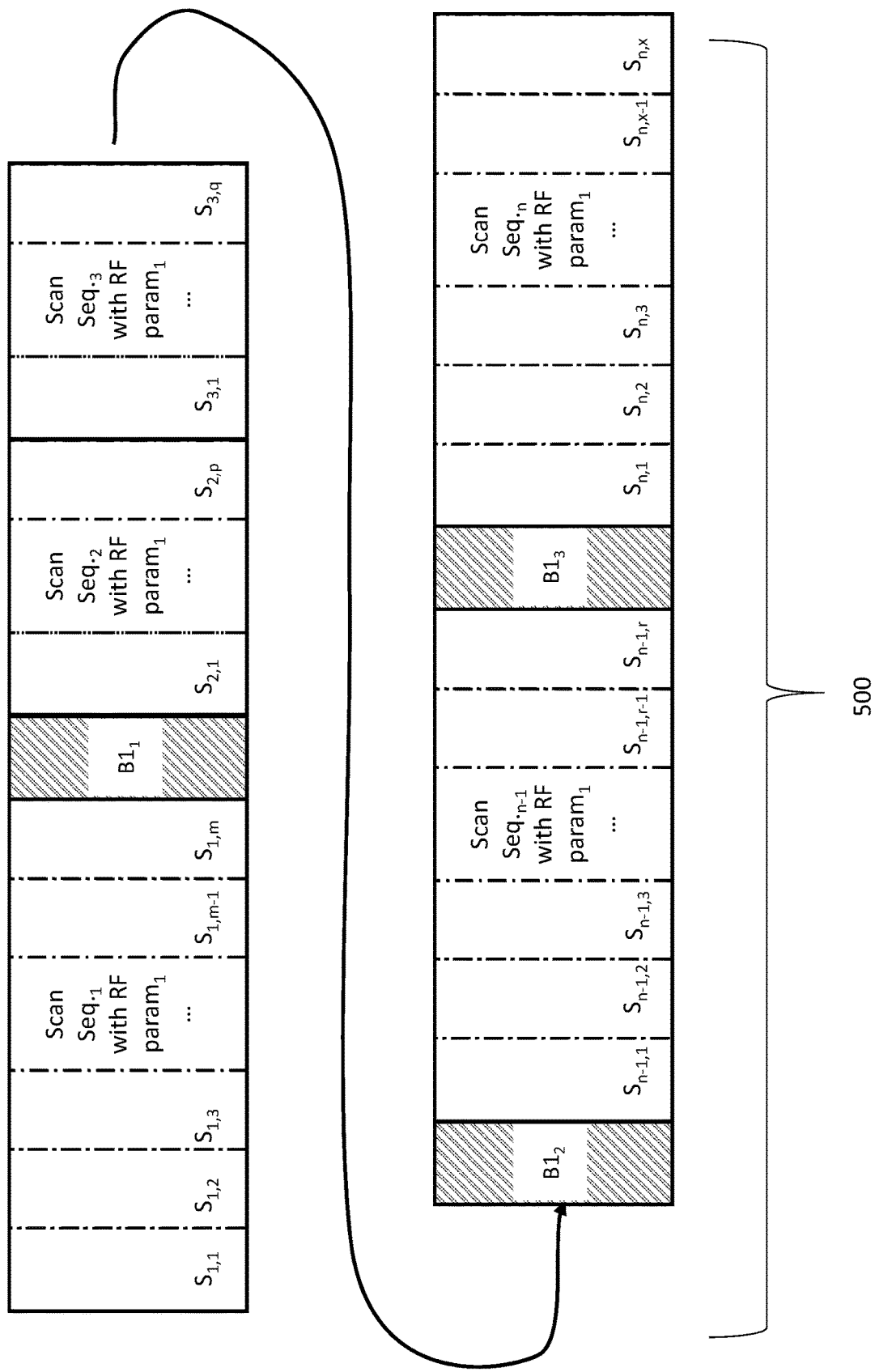
FIG. 8A illustrates a series of scan sequences that has been augmented with an interspersed series of B1 amplitude measurement sequences such that a B1 amplitude measurement sequence is statically inserted periodically within the series of scan sequences but between scan sequences of the series of scan sequences.
Figure 8B:
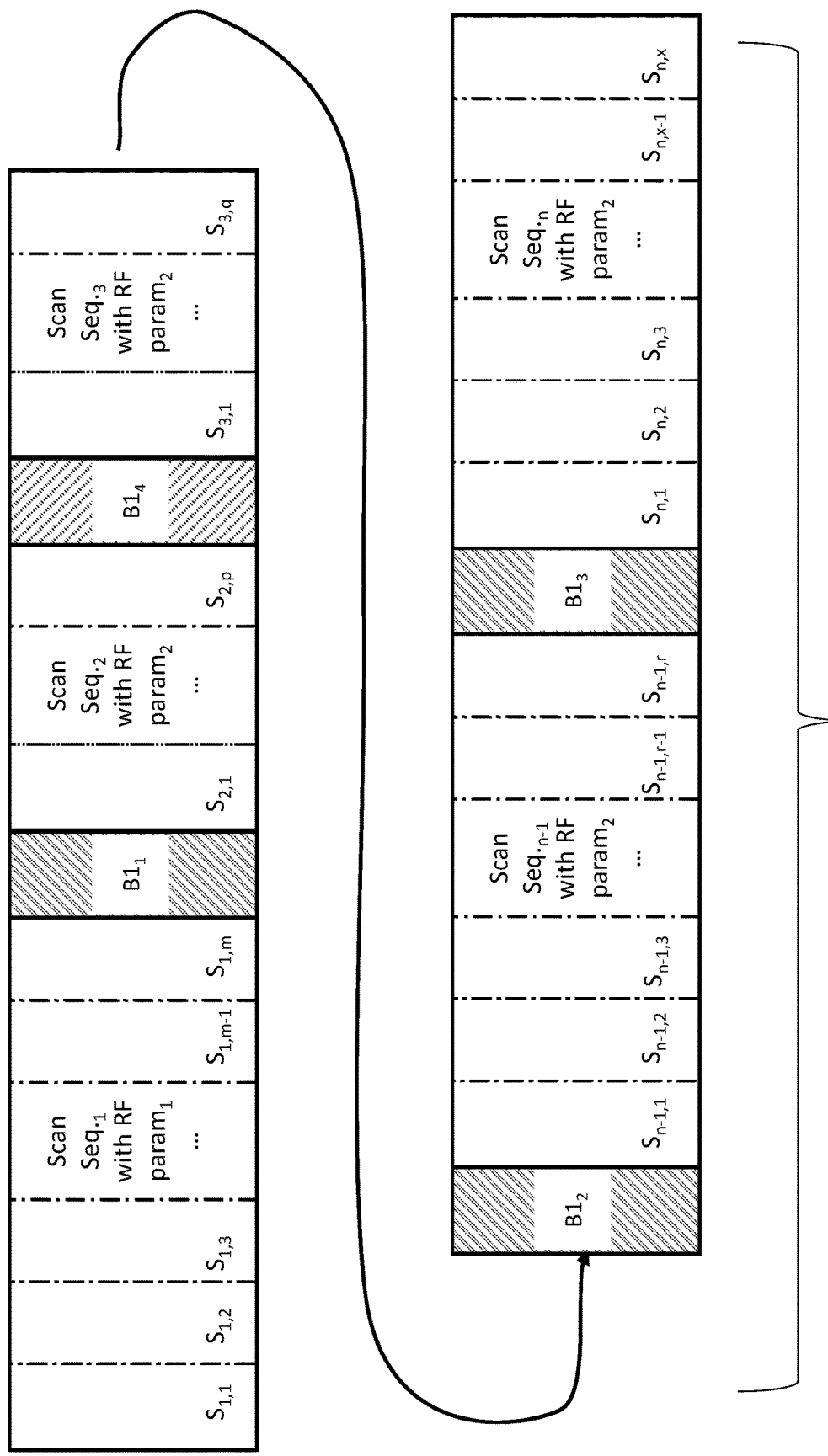
FIG. 8B illustrates the augmented series of scan sequences of FIG. 8A that has been further dynamically augmented with a fourth B1 amplitude measurement sequence interspersed within the series of scan sequences based on a measured result of a previously performed B1 amplitude measurement sequence.

FIG. 8A illustrates a series of scan sequences that has been augmented with a series of B1 amplitude measurement sequences such that a B1 amplitude measurement sequence is statically inserted between a number of pairs of scan sequences within the series of scan sequences. For illustrative purposes, the B1 amplitude measurement sequences of the inserted series of B1 amplitude measurement sequences are assumed to be inserted periodically between scan sequences every "y" seconds. While processing the augmented scan sequence of FIG. 8A, the system determines (step 340 of FIGS. 3A and 3C) that the measured result of the first B1 amplitude measurement ($B1_1$) indicates that the RF level has changed more than a threshold amount compared with a reference level. Accordingly, the system updates the RF parameters (from RF $param_1$ to RF $param_2$) associated with the subsequent scan sequences to accommodate for the change in RF level. FIG. 8B illustrates the changes in RF parameter values.

FIG. 8B further illustrates that the original augmented series of scan sequences of FIG. 8A has been further dynamically augmented with a fourth B1 amplitude measurement sequence ($B1_4$ with opposite hash markings compared to $B1_1$) inserted within the series of scan sequences based on the measured result of the previously performed B1 amplitude measurement sequence (labeled $B1_1$). For example, if the measured result indicated a large change in the RF level of B11 compared to its reference value (step 350 of FIG. 3B), then the system may insert more B1 amplitude measurement sequences (e.g., $B1_4$) than originally inserted (step 360 of FIG. 3B) so that the system can more quickly assess whether the changes made in response to the $B1_1$ measurement have resulted in a more closely calibrated system. Such a dynamic insertion can be performed whenever a large difference is detected. Alternatively, in the presence of a series of measurement results that are consistent with their expected values, the system may dynamically remove previously inserted B1 amplitude measurement sequences (step 360 of FIG. 3B).

Figure 9:
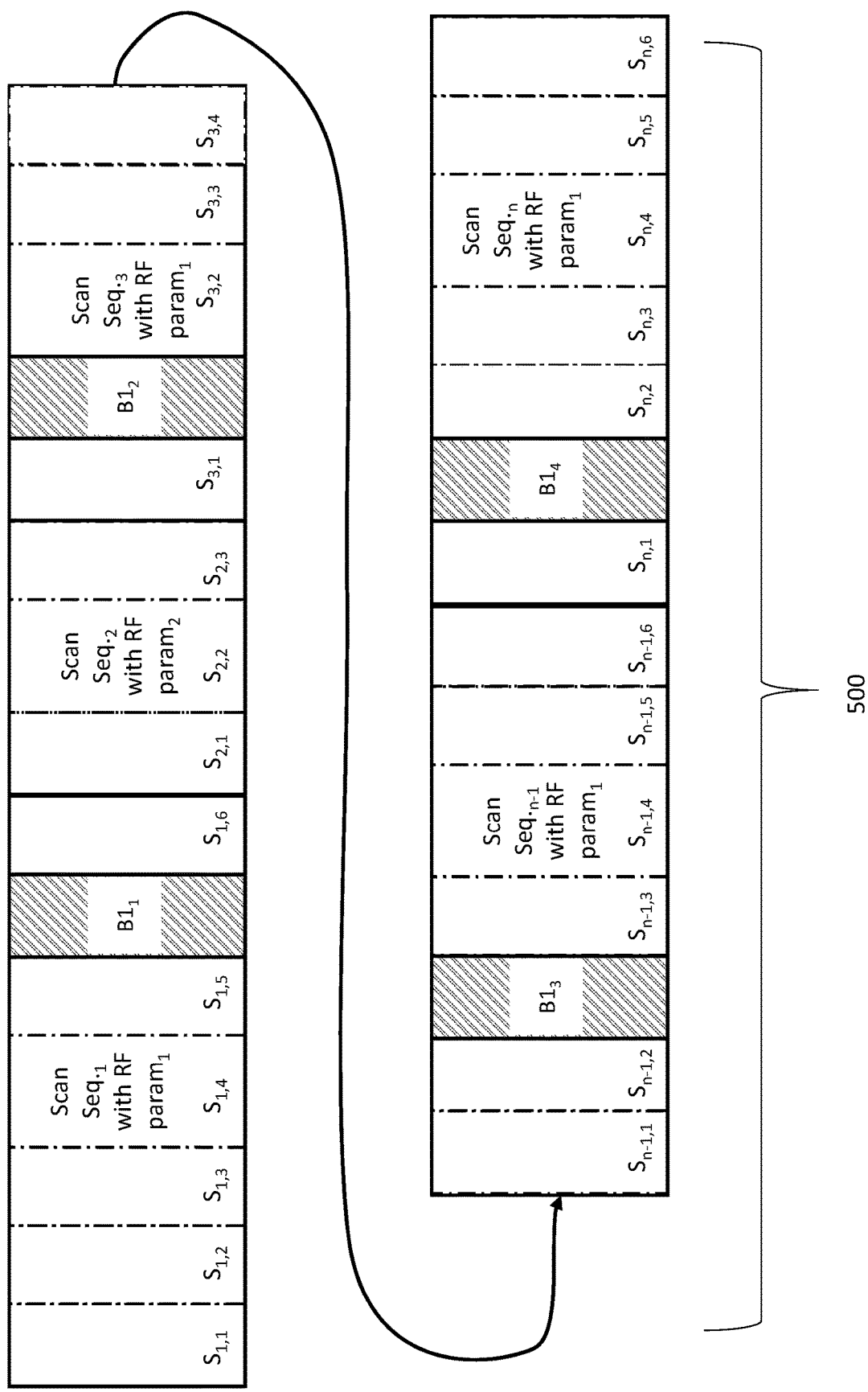
FIG. 9 illustrates a series of scan sequences that has been augmented with an interspersed series of B1 amplitude measurement sequences such that a B1 amplitude measurement sequence is periodically interspersed within the respective shots of the series of scan sequences.

FIG. 9 illustrates a series of scan sequences that has been augmented with a series of B1 amplitude measurement sequences such that a B1 amplitude measurement sequence is inserted periodically within the respective shots of the series of scan sequences rather than only between adjacent scan sequences. As shown in FIG. 9, a B1 amplitude measurement sequence is inserted every "x" shots (where "x" shots is illustrated as 6 shots). Thus, a portion of some scan sequences may be temporarily interrupted to perform calibration checks which can be important in long sequences that have large thermal changes. Such sequences with large thermal changes include arterial spin labeling (ASL), magnetization transfer (MT), steady-state free precession (SSFP) and other sequences with frequent application of RF pulses.

Figure 10:
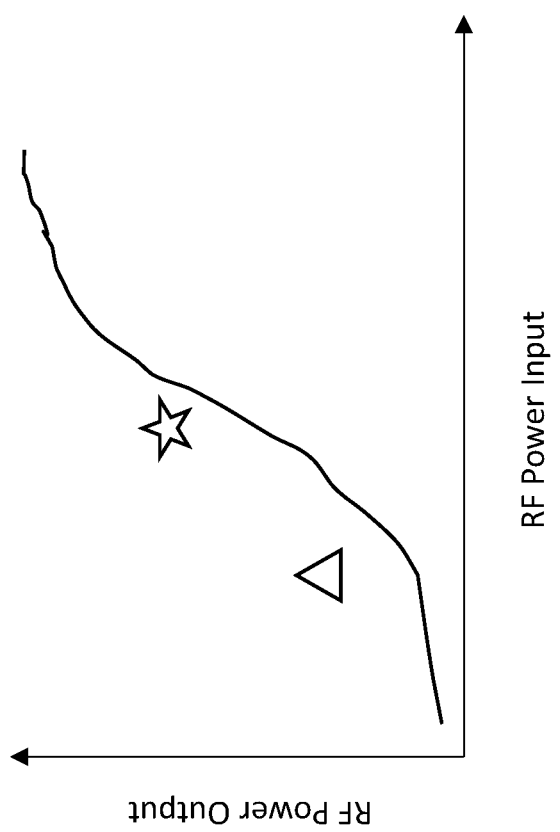
FIG. 10 is a graph showing a non-linear response for an RF power amplifier over a range of RF power inputs.

In one embodiment of an MRI system, a power amplifier may be used that does not have a linear response to applied RF power inputs. FIG. 10 is a graph showing a non-linear response for an RF power amplifier over a range of RF power inputs. Such non-linear responses are more common in smaller and less expensive RF power amplifiers. Moreover, even some RF amplifiers that exhibit near-linear responses in some operating regions will not necessarily provide the same linear response in all regions. Accordingly, operating an RF power amplifier in different regions of its operating curve may produce different results. As a result, calibrating the transmitter power for routine scanning in the central region of its operating curve (represented by the star) may be sub-optimal when performing another scan in a lower portion of the operating curve (represented by the triangle) based on the RF pulses in the sequence involved. There also can be limitations on peak RF power such as due to B1rms limits to ensure the safety of patient and hardware in the case of MR-compatible implantable devices. In this situation, the B1 magnetic field will be different (lower) for a given input power than what would be expected had the amplifier been operating in the central part of the operating curve. In this case, a method can be used to measure this change by adjusting the transmit power of the BSS sensitization RF pulse(s) inside the sequence. And thus, the BSS method can measure the B1 magnetic field output in this lower range. The result of that measurement can provide a correction factor to be used to correct the B1 output of the sequence, and thus maintain consistency.

In this way, a method can be used to track the effect of changing conditions within the hardware of an MRI scanner. This may allow the scanner to produce a more consistent B1 magnetic field even in the presence of heating or other operating nonlinearities. This ability may also be leveraged to reduce the cost of the hardware components. For example, a system designer can choose to build a Tx coil with thinner (more resistive) conductors being used in the Tx coil and/or include less thermal energy removal. A cheaper or smaller, and therefore more nonlinear, RF power amplifier may be used to save on cost and/or size. By using the technique described herein, a consistent B1 magnetic field can be maintained throughout a series of scans even in the presence of hardware inconsistency or imperfection.

Figure 11:
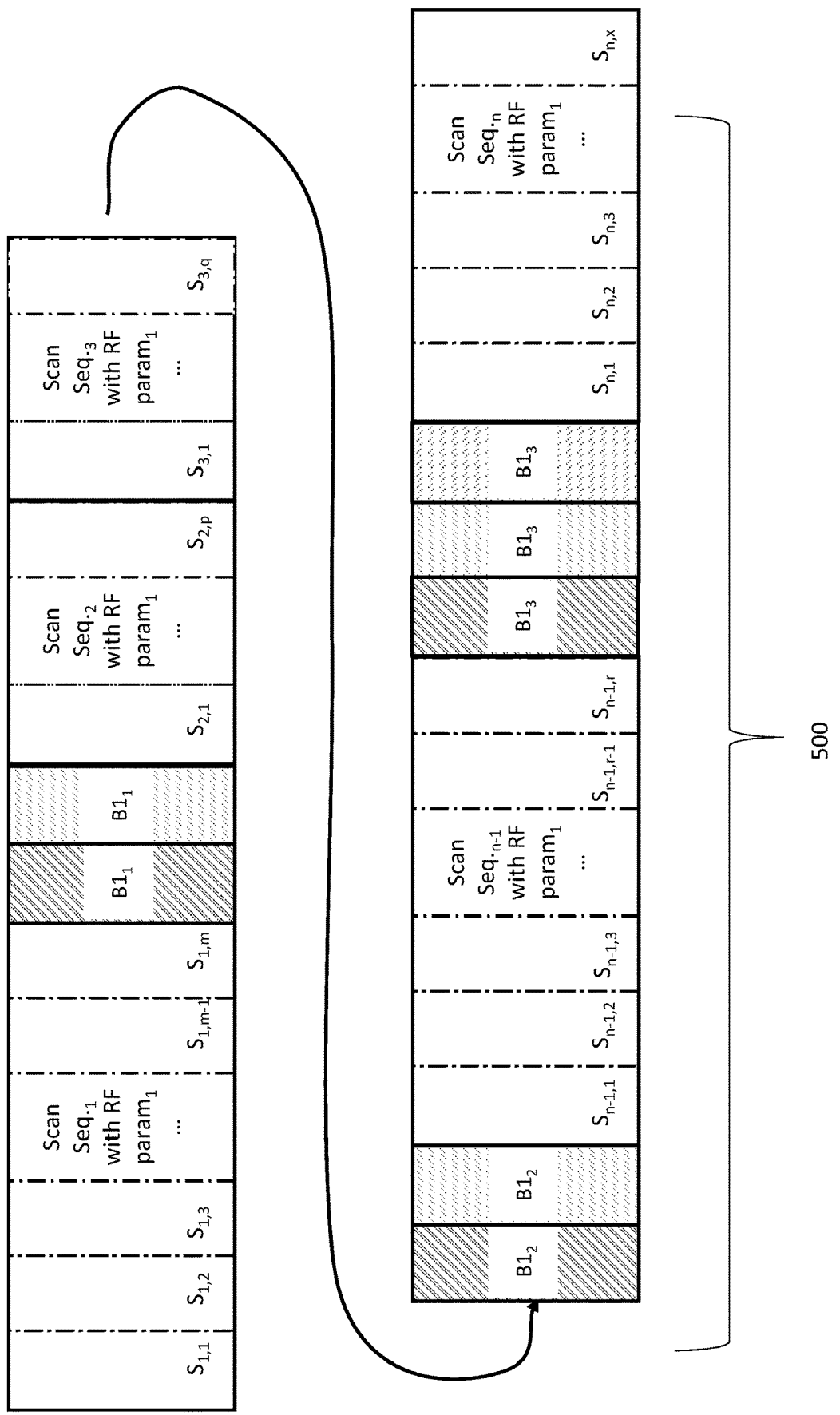
FIG. 11 illustrates the series of scan sequences that has been augmented with an interspersed series of multi-shot B1 amplitude measurement sequences such that a multi-shot B1 amplitude measurement sequence is periodically interspersed within the series of scan sequences but between scan sequences of the series of scan sequences.

FIG. 11 illustrates a series of scan sequences that has been augmented with a series of multi-shot B1 amplitude measurement sequences such that a multi-shot B1 amplitude measurement sequence is inserted periodically within the series of scan sequences but between scans of the series of scan sequences. Multi-shot B1 amplitude measurement sequences can be inserted statically or dynamically. While FIG. 11 illustrates the multi-shot B1 amplitude measurement sequences being inserted between adjacent scan sequences, in an alternate embodiment they can be installed between shots within a scan sequence. Furthermore, the number of shots in multi-shot B1 amplitude measurement sequences within an examination need not be the same. FIG. 11 illustrates an examination with two two-shot B1 amplitude measurement sequences and one three-shot B1 amplitude measurement sequence. Exemplary two-shot B1 amplitude measurement sequences are a low and a mid-range shot, a low and a high range shot, and a high and a mid-range shot. Other numbers of shots can be used in multi-shot B1 amplitude measurement sequences (e.g., greater than three), and the distribution of the shots across the operating range of the amplifier need not be uniform. Such multi-shot B1 amplitude measurement sequences can be statically or dynamically combined with single-shot B1 amplitude measurement sequences also. The system can then use an amplifier gain-specific calibration to better specify the flip angle to use and/or the amplifier gain to apply, and interpolation can be used to obtain correction values at power levels between the power levels used in the multi-shot B1 amplitude sequences.

The B1 measurement method can be designed to be non-selective, slice-selective, 1D spatially selective (pencil beam), 2D spatially selective (map), or 3D spatially selective (volume). For its intended use case interspersed between scans or between shots of a scan, a fast method is preferred. A 1D spatially selective pencil beam is an ideal method due to its speed because it can be acquired in one or a few shots. For example, a minimum of two shots is required for pencil beam when using the BSS sequence (+/−BSS RF offset frequency).

The advantage of a spatially selective method is that a focal region, such as region of interest (ROI), can be selected from the spatially resolved data. Thus, the B1 field can be measured from only that selected region. Thus, the RFL value can be determined for the specific ROI alone. This allows the RFL (and flip angle) to be calculated based on the spatial information that is most important to the portion of the image that is of interest. This might be interesting for clinical applications where a smaller organ is an anatomy of interest, such as the heart inside the chest. By measuring the spatially resolved B1 in the ROI, and maintaining consistent RFL using the method described herein, image quality can be maintained for the anatomy of interest.

As known to those in the art, such 1D spatially resolved methods can be applied at a chosen projection angle by setting the {Gx, Gy, Gz} gradient amplitudes of the B1 measurement sequence. A single projection may be acquired. The projection angle to be used can be limited to be along key orientations in order to improve the sensitivity of detection of the ROI. More than one projection may also be used to better localize the B1 data from the ROI.

BSS calculations described herein can be spin echo BSS calculations or field echo BSS calculations. Spin echo BSS can be used to be less sensitive to B0 at the cost of longer TR, and therefore longer shot time. Field echo BSS also can be used and gives information about B0 drift. By averaging two TRs in BSS shot (+/−BSS RF offset frequency), a measure of the average phase in the projection is calculated. This average phase can be monitored longitudinally as a surrogate measure of B0 drift given that $\Delta B0 = (\phi\text{update} - \phi\text{preference})/TE$, where TE is the echo time of the field echo sequence.

Figure 12:
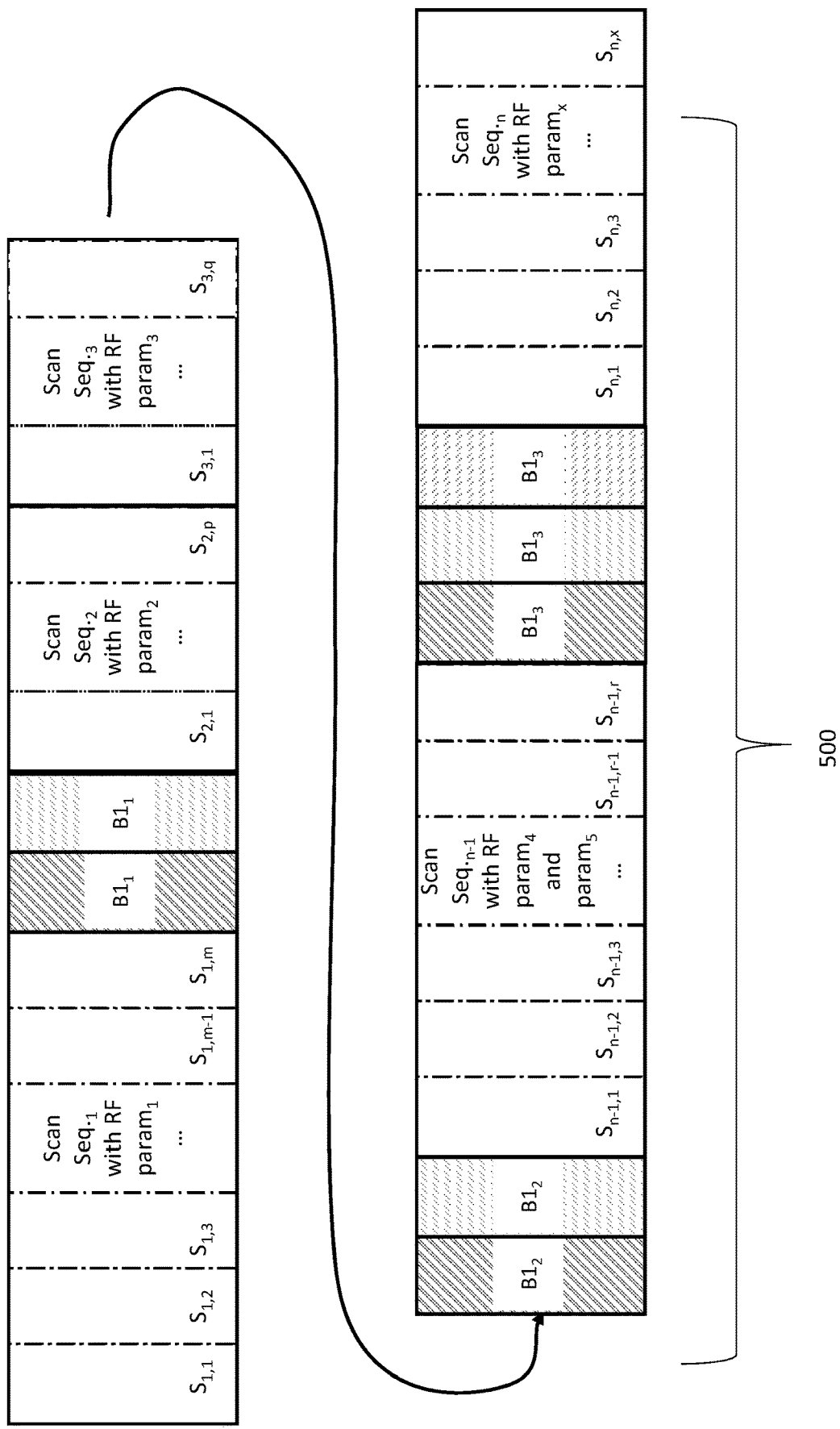
FIG. 12 illustrates a modification of the series of scan sequences that was augmented with the interspersed series of multi-shot B1 amplitude measurement sequences of FIG. 11 that has had RF parameters changed as a result of executing multi-shot B1 amplitude measurement sequences.

FIG. 12 illustrates a modification of the series of scan sequences that was augmented with the series of multi-shot B1 amplitude measurement sequences of FIG. 11 that has had RF parameters changed as a result of executing multi-shot B1 amplitude measurement sequences. As shown therein, as a result of executing the first pair of multi-shot B1 amplitude measurement sequences, scan sequences 2 and 3 are updated but differently. Based on a result of the first B1 amplitude measurement sequence at a first power level similar to that of scan sequence 2, the RF parameter of scan sequence 2 is updated, and based on a result of the second B1 amplitude measurement sequence at a second power level similar to scan sequence 3, the RF parameter of scan sequence 3 is updated. Similarly, as a result of executing the second pair of multi-shot B1 amplitude measurement sequences, scan sequence (n−1) is updated to use RF parameters 4 and 5 (rather than a single RF parameter as was specified by the original pulse sequence).

In one embodiment of the techniques discussed above, changes in RF parameters are made by the MRI sequence controller 34 (acting as an RF transmitter coil controller) such that updated pulses (compared to those for the originally received scan sequences of the examination) are sent to the RF transmitter 33. In an alternative embodiment, the RF transmitter 33 is configured to include variable gain hardware (programmable by the processing circuitry 40 acting as an RF transmitter coil controller) that modifies a gain amount to be applied to the pulses that the RF transmitter 33 receives from the MRI sequence controller 34. As shown in FIGS. 13A-13D, a correction table (CT) can be included in the RF transmitter 33 that the processing circuitry 40 can update to make the corrections determined to be needed as a result of executing at least one B1 amplitude measurement sequence. FIG. 13A shows that the correction table is initially configured to store correction values of 1.0, such that no correction to a received RF level is made (i.e., RF*1.0=RF). As shown in FIG. 13B, as a result of a first B1 amplitude measurement sequence, the correction table is reconfigured to include two exemplary correction factors V2 and V3 corresponding to the upper and lower halves, respectively, of the RF curve of FIG. 10. As shown in FIG. 13C, as a result of a second B1 amplitude measurement sequence, the correction table is reconfigured to include two exemplary correction factors V5 and V4 corresponding to the upper and lower halves, respectively, of the RF curve of FIG. 10. As shown in FIG. 13D, as a result of a third B1 amplitude measurement sequence, the correction table is reconfigured to include numerous separate correction factors for performing targeted corrections to the RF curve of FIG. 10.

Figure 14:
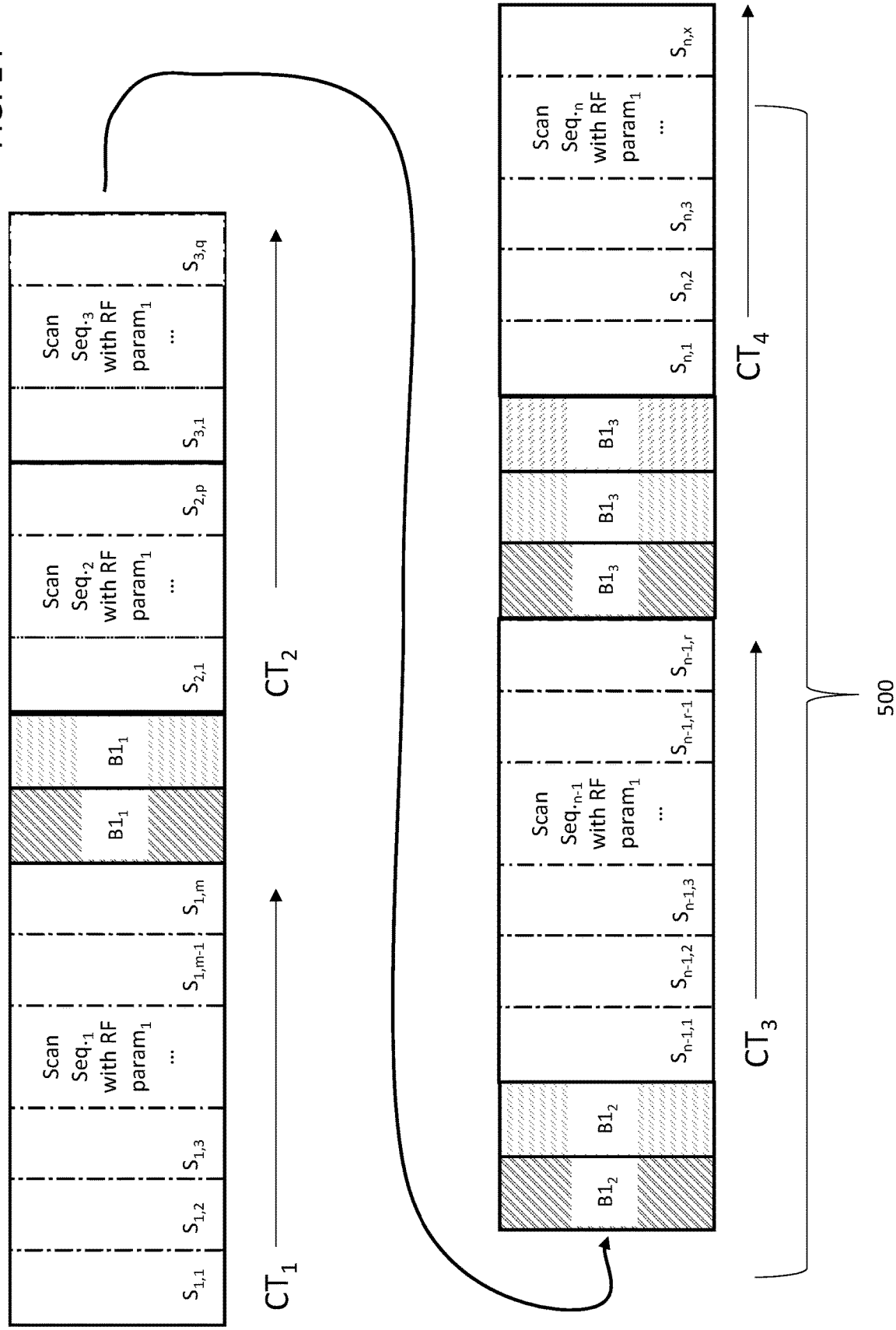
FIG. 14 illustrates the series of scan sequences that was augmented with the series of multi-shot B1 amplitude measurement sequences of FIG. 11 that utilizes changes to a correction table to indirectly modify the series of scan sequences.

As shown in FIG. 14, rather than updating the RF parameters of the scan sequence directly (by changing values sent from the MRI sequence controller 34 to the RF transmitter 33), the RF parameters of the scan sequences can be updated indirectly by modifying the correction table inside the RF transmitter 33. FIG. 14 shows the use of the dynamically reconfigured correction table having 4 different sets of correction factors over the course of an examination. In yet another embodiment, the RF transmitter 33 can be configured with an analog gain amplifier (not shown) that increases the gain of the RF transmitter 33 directly without changing the digital values applied to the RF transmitter 33 (either directly from the sequence controller 34 or from a correction table interposed between the RF transmitter 33 and the sequence controller 34).

In addition to the other configurations and methods described herein, other configurations and methods are set forth in the not limiting parentheticals set forth below. Those include, but are not limited to:

(1) A medical image processing method including, but not limited to: obtaining a first B1 amplitude measurement sequence interspersed within a series of MRI scan sequences for use in a single MRI examination, wherein the series of MRI scan sequences includes a first MRI scan sequence and a second MRI scan sequence, wherein the second MRI scan sequence includes a first RF parameter value; performing the first MRI scan sequence and the first B1 amplitude measurement sequence; determining if a measured result of having performed the first B1 amplitude measurement sequence indicates that a change in the first RF parameter value is to be made for the second MRI scan sequence; and when the measured result of having performed the first B1 amplitude measurement sequence has been determined to indicate that a change in the first RF parameter value is to be made for the second MRI scan sequence (1) modifying the first RF parameter value of the second MRI scan sequence to be a second RF parameter value different than the first RF parameter value and (2) performing the second MRI scan sequence using the second RF parameter value.

(2) The method according to (1), further including, but not limited to, when the measured result of having performed the first B1 amplitude measurement sequence has been determined to not indicate that a change in the first RF parameter value is to be made for the second MRI scan sequence, performing the second MRI scan sequence using the first RF parameter value.

(3) The method according to any one of (1)-(2), wherein the first B1 amplitude measurement sequence is interspersed within the series of MRI scan sequences prior to performing a first MRI scan sequence of the series of MRI scan sequences.

(4) The method according to (3), wherein a second B1 amplitude measurement sequence also is interspersed within the series of MRI scan sequences prior to performing the first MRI scan sequence, and wherein the first and second B1 amplitude measurement sequences are interspersed between MRI scan sequences of the series of MRI scan sequences that are closest to a specified period.

(5) The method according to (3), wherein at least one B1 amplitude measurement sequence is interspersed between each MRI scan sequence of the series of MRI scan sequences.

(6) The method according to (3), wherein a second B1 amplitude measurement sequence also is interspersed within the series of MRI scan sequences prior to performing the first MRI scan sequence, and wherein the first and second B1 amplitude measurement sequences are interspersed between shots of the series of MRI scan sequences that are closest to a specified period.

(7) The method according to any one of (1)-(6), further including, but not limited to, interspersing a second B1 amplitude measurement sequence within the series of MRI scan sequences after performing the first B1 amplitude measurement sequence.

(8) The method according to (7), wherein interspersing the second B1 amplitude measurement sequence comprises interspersing the second B1 amplitude measurement sequence between MRI scan sequences of the series of MRI scan sequences.

(9) The method according to (7), wherein interspersing the second B1 amplitude measurement sequence comprises interspersing the second B1 amplitude measurement sequence between shots of an MRI scan sequence of the series of MRI scan sequences.

(10) The method according to any one of (1)-(9), wherein the first B1 amplitude measurement sequence is a Bloch-Siegert Shift measurement sequence.

(11) The method according to any one of (1)-(2), wherein the first and second RF parameter values are related to a flip angle, and wherein the first B1 amplitude measurement sequence measures spatially selective data and only a region corresponding to the spatially selective data is used to calculate a change from the first RF parameter value to the second RF parameter value.

(12) The method according to any one of (1)-(2), further including, but not limited to, obtaining an RF level reference value as part of a patient pre-scan preceding the series of MRI scan sequences for the patient; wherein determining if the measured result of having performed the first B1 amplitude measurement sequence indicates that the change in the first RF parameter value is to be made for the second MRI scan sequence comprises using the RF level reference value to determine if the measured result of having performed the first B1 amplitude measurement sequence indicates that the change in the first RF parameter value is to be made for the second MRI scan sequence.

(13) The method according to any one of (1)-(12), wherein the first B1 amplitude measurement sequence is a single shot.

(14) The method according to any one of (1)-(12), wherein the first B1 amplitude measurement sequence comprises multiple shots, and wherein determining if the measured result indicates that the change in the first RF parameter value is to be made for the second MRI scan sequence comprises determining, based on the multiple shots, if the measured result indicates that the change in the first RF parameter value is to be made for the second MRI scan sequence.

(15) The method according to any one of (1)-(14), wherein determining if the measured result of having performed the first B1 amplitude measurement sequence indicates that the change in the first RF parameter value is to be made for the second MRI scan sequence comprises inputting the measured result into a system physics model to receive at least one of a prediction and a correction of the first RF parameter value.

(16) The method according to any one of (1)-(15), wherein the first and second RF parameter values are selected from a group consisting of flip angles and amplifier gains.

(17) The method according to any one of (1)-(16), wherein modifying the first RF parameter value of the second MRI scan sequence to be the second RF parameter value comprises modifying a pulse sequence applied to a sequence controller.

(18) The method according to any one of (1)-(17), wherein modifying the first RF parameter value of the second MRI scan sequence to be the second RF parameter value comprises modifying a correction table of an RF transmitter.

(19) A Magnetic Resonance Imaging (MRI) system including, but not limited to: a gantry; at least one RF transmitter coil; and an RF transmitter coil controller configured to perform the methods of any one of (1)-(18).

(20) A computer program product including, but not limited to: a computer readable storage medium configured to be communicatively coupled to a computer processor, wherein the computer readable storage medium includes computer instructions which, when executed by the computer processor, cause the computer processor to perform the methods of any one of (1)-(18).

While certain implementations have been described, these implementations have been presented by way of example only, and are not intended to limit the teachings of this disclosure. Indeed, the novel methods, apparatuses and systems described herein can be embodied in a variety of other forms; furthermore, various omissions, substitutions and changes in the form of the methods, apparatuses and systems described herein can be made without departing from the spirit of this disclosure.

The invention claimed is:

1. A medical image processing method comprising:
obtaining a first B1 amplitude measurement sequence interspersed within a series of MRI scan sequences for use in a single MRI examination, wherein the series of MRI scan sequences includes a first MRI scan sequence and a second MRI scan sequence, wherein the second MRI scan sequence includes a first RF parameter value;
performing the first MRI scan sequence and the first B1 amplitude measurement sequence;
determining if a measured result of having performed the first B1 amplitude measurement sequence indicates that a change in the first RF parameter value is to be made for the second MRI scan sequence; and when the measured result of having performed the first B1 amplitude measurement sequence has been determined to indicate that a change in the first RF parameter value is to be made for the second MRI scan sequence (1) modifying the first RF parameter value of the second MRI scan sequence to be a second RF parameter value different than the first RF parameter value and (2) performing the second MRI scan sequence using the second RF parameter value.

2. The method according to claim 1, further comprising, when the measured result of having performed the first B1 amplitude measurement sequence has been determined to not indicate that a change in the first RF parameter value is to be made for the second MRI scan sequence, performing the second MRI scan sequence using the first RF parameter value.

3. The method according to claim 1, wherein the first B1 amplitude measurement sequence is interspersed within the series of MRI scan sequences prior to performing the first MRI scan sequence of the series of MRI scan sequences.

4. The method according to claim 3, wherein a second B1 amplitude measurement sequence also is interspersed within the series of MRI scan sequences prior to performing the first MRI scan sequence, and
wherein the first and second B1 amplitude measurement sequences are interspersed between MRI scan sequences of the series of MRI scan sequences that are closest to a specified period.

5. The method according to claim 3, wherein at least one B1 amplitude measurement sequence is interspersed between each MRI scan sequence of the series of MRI scan sequences.

6. The method according to claim 3, wherein a second B1 amplitude measurement sequence also is interspersed within the series of MRI scan sequences prior to performing the first MRI scan sequence, and
wherein the first and second B1 amplitude measurement sequences are interspersed between shots of the series of MRI scan sequences that are closest to a specified period.

7. The method according to claim 1, further comprising interspersing a second B1 amplitude measurement sequence within the series of MRI scan sequences after performing the first B1 amplitude measurement sequence.

8. The method according to claim 7, wherein interspersing the second B1 amplitude measurement sequence comprises interspersing the second B1 amplitude measurement sequence between MRI scan sequences of the series of MRI scan sequences.

9. The method according to claim 7, wherein interspersing the second B1 amplitude measurement sequence comprises interspersing the second B1 amplitude measurement sequence between shots of an MRI scan sequence of the series of MRI scan sequences.

10. The method according to claim 1, wherein the first B1 amplitude measurement sequence is a Bloch-Siegert Shift measurement sequence.

11. The method according to claim 1, wherein the first and second RF parameter values are related to a flip angle, and wherein the first B1 amplitude measurement sequence measures spatially selective data and only a region corresponding to the spatially selective data is used to calculate a change from the first RF parameter value to the second RF parameter value.

12. The method according to claim 1, further comprising obtaining an RF level reference value as part of a patient pre-scan preceding the series of MRI scan sequences for the patient,
wherein determining if the measured result of having performed the first B1 amplitude measurement sequence indicates that the change in the first RF parameter value is to be made for the second MRI scan sequence comprises using the RF level reference value to determine if the measured result of having performed the first B1 amplitude measurement sequence indicates that the change in the first RF parameter value is to be made for the second MRI scan sequence.

13. The method according to claim 1, wherein the first B1 amplitude measurement sequence is a single shot.

14. The method according to claim 1, wherein the first B1 amplitude measurement sequence comprises multiple shots, and wherein determining if the measured result indicates that the change in the first RF parameter value is to be made for the second MRI scan sequence comprises determining, based on the multiple shots, if the measured result indicates that the change in the first RF parameter value is to be made for the second MRI scan sequence.

15. The method according to claim 1, wherein determining if the measured result of having performed the first B1 amplitude measurement sequence indicates that the change in the first RF parameter value is to be made for the second MRI scan sequence comprises inputting the measured result into a system physics model to receive at least one of a prediction and a correction of the first RF parameter value.

16. The method according to claim 1, wherein the first and second RF parameter values are selected from a group consisting of flip angles and amplifier gains.

17. The method according to claim 1, wherein modifying the first RF parameter value of the second MRI scan sequence to be the second RF parameter value comprises modifying a pulse sequence applied to a sequence controller.

18. The method according to claim 1, wherein modifying the first RF parameter value of the second MRI scan sequence to be the second RF parameter value comprises modifying a correction table of an RF transmitter.

19. A Magnetic Resonance Imaging (MRI) system comprising:
a gantry;
at least one RF transmitter coil; and
an RF transmitter coil controller configured to:
obtain a first B1 amplitude measurement sequence interspersed within a series of MRI scan sequences for use in a single MRI examination, wherein the series of MRI scan sequences includes a first MRI scan sequence and a second MRI scan sequence, wherein the second MRI scan sequence includes a first RF parameter value;
perform the first MRI scan sequence and the first B1 amplitude measurement sequence;
determine if a measured result of having performed the first B1 amplitude measurement sequence indicates that a change in the first RF parameter value is to be made for the second MRI scan sequence; and
when the measured result of having performed the first B1 amplitude measurement sequence has been determined to indicate that a change in the first RF parameter value is to be made for the second MRI scan sequence (1) modify the first RF parameter value of the second MRI scan sequence to be a second RF parameter value different than the first RF parameter value and (2) perform the second MRI scan sequence using the second RF parameter value.

20. A computer program product comprising:
a non-transitory computer readable storage medium configured to be communicatively coupled to a computer processor, wherein the computer readable storage medium includes computer instructions which, when executed by the computer processor, cause the computer processor to perform the steps of:
obtaining a first B1 amplitude measurement sequence interspersed within a series of MRI scan sequences for use in a single MRI examination, wherein the series of MRI scan sequences includes a first MRI scan sequence and a second MRI scan sequence, wherein the second MRI scan sequence includes a first RF parameter value;
performing the first MRI scan sequence and the first B1 amplitude measurement sequence;
determining if a measured result of having performed the first B1 amplitude measurement sequence indicates that a change in the first RF parameter value is to be made for the second MRI scan sequence; and
when the measured result of having performed the first B1 amplitude measurement sequence has been determined to indicate that a change in the first RF parameter value is to be made for the second MRI scan sequence (1) modifying the first RF parameter value of the second MRI scan sequence to be a second RF parameter value different than the first RF parameter value and (2) performing the second MRI scan sequence using the second RF parameter value.

* * * * *